(12) United States Patent
Sakashita et al.

(10) Patent No.: US 8,348,023 B2
(45) Date of Patent: Jan. 8, 2013

(54) DISK BRAKE

(75) Inventors: Takayasu Sakashita, Tokyo (JP); Jun Watanabe, Kofu (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 307 days.

(21) Appl. No.: 12/644,503

(22) Filed: Dec. 22, 2009

(65) Prior Publication Data

US 2010/0163351 A1 Jul. 1, 2010

(30) Foreign Application Priority Data

Dec. 26, 2008 (JP) .................................. 2008-333185
Sep. 30, 2009 (JP) .................................. 2009-228611

(51) Int. Cl.
*F16D 55/08* (2006.01)
(52) U.S. Cl. ........................ 188/72.1; 188/265
(58) Field of Classification Search ............ 188/17, 188/18 A, 18 R, 71.1, 71.2, 72.1, 72.9, 265; 74/575; 192/43.1; 475/323–324, 149
See application file for complete search history.

(56) References Cited

U.S. PATENT DOCUMENTS

| | | | | |
|---|---|---|---|---|
| 4,480,733 A * | 11/1984 | Grimm et al. | ............ | 192/223.3 |
| 6,349,801 B1 * | 2/2002 | Koth et al. | .................. | 188/72.8 |
| 6,387,008 B1 * | 5/2002 | Chen et al. | .................... | 475/296 |
| 2003/0042084 A1 * | 3/2003 | Kawase et al. | ............... | 188/72.1 |
| 2005/0217952 A1 * | 10/2005 | Usui | ............................. | 188/265 |

FOREIGN PATENT DOCUMENTS

JP 2006-177532 7/2006

* cited by examiner

*Primary Examiner* — Robert A Siconolfi
*Assistant Examiner* — Anna Momper
(74) *Attorney, Agent, or Firm* — Wenderoth, Lind & Ponack, LLP

(57) ABSTRACT

An object of the present invention is to provide a disk brake having excellent responsiveness. A rotation preventing mechanism 34A prevents a rotation of a carrier 41 (one output member) in a direction causing a piston 12 to return. An internal gear 46 (the other output member) rotates by a predetermined degree to act on the rotation preventing mechanism 34A. When the motor 38 causes a sun gear (input member) to rotate such that the piston 12 moves in a return direction, a rotation of the internal gear 46 according to the rotation of the sun gear 44 releases rotation prevention of the rotation preventing mechanism 34A to the carrier 41. It is possible to release the parking brake without use of a worm gear which is used in the conventional arts for holding a thrust force (self-holding). As a result, it is possible to quickly release the parking brake, and therefore a driver can start to run without delay after parking brake release, whereby the responsiveness is improved.

20 Claims, 18 Drawing Sheets

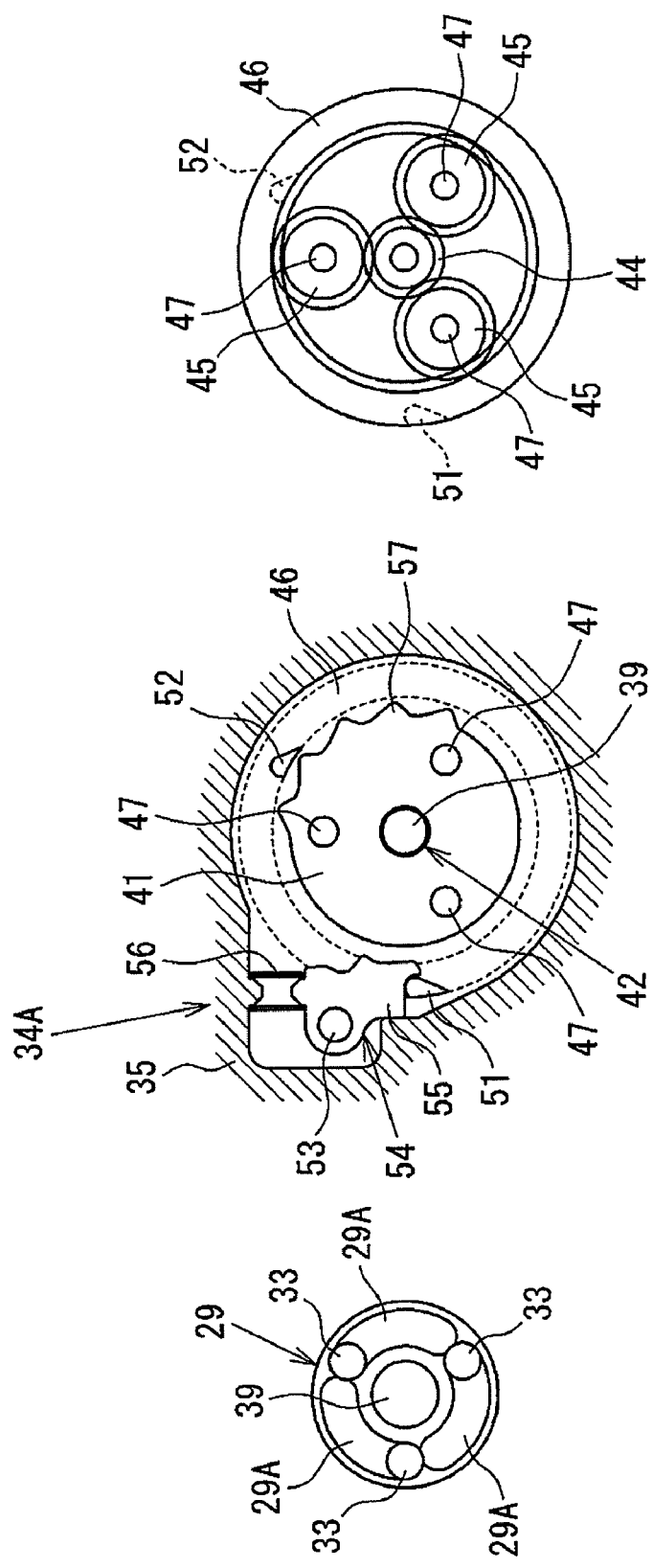
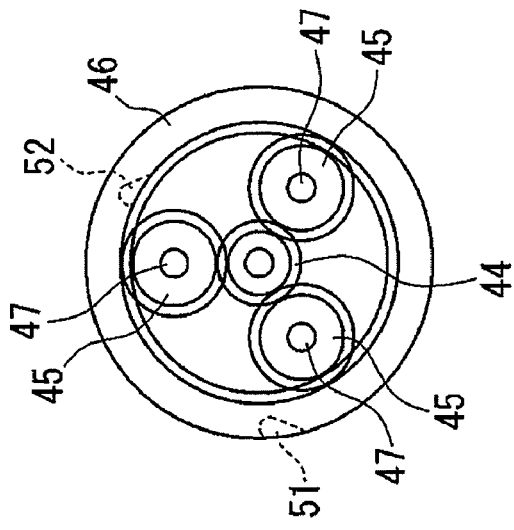

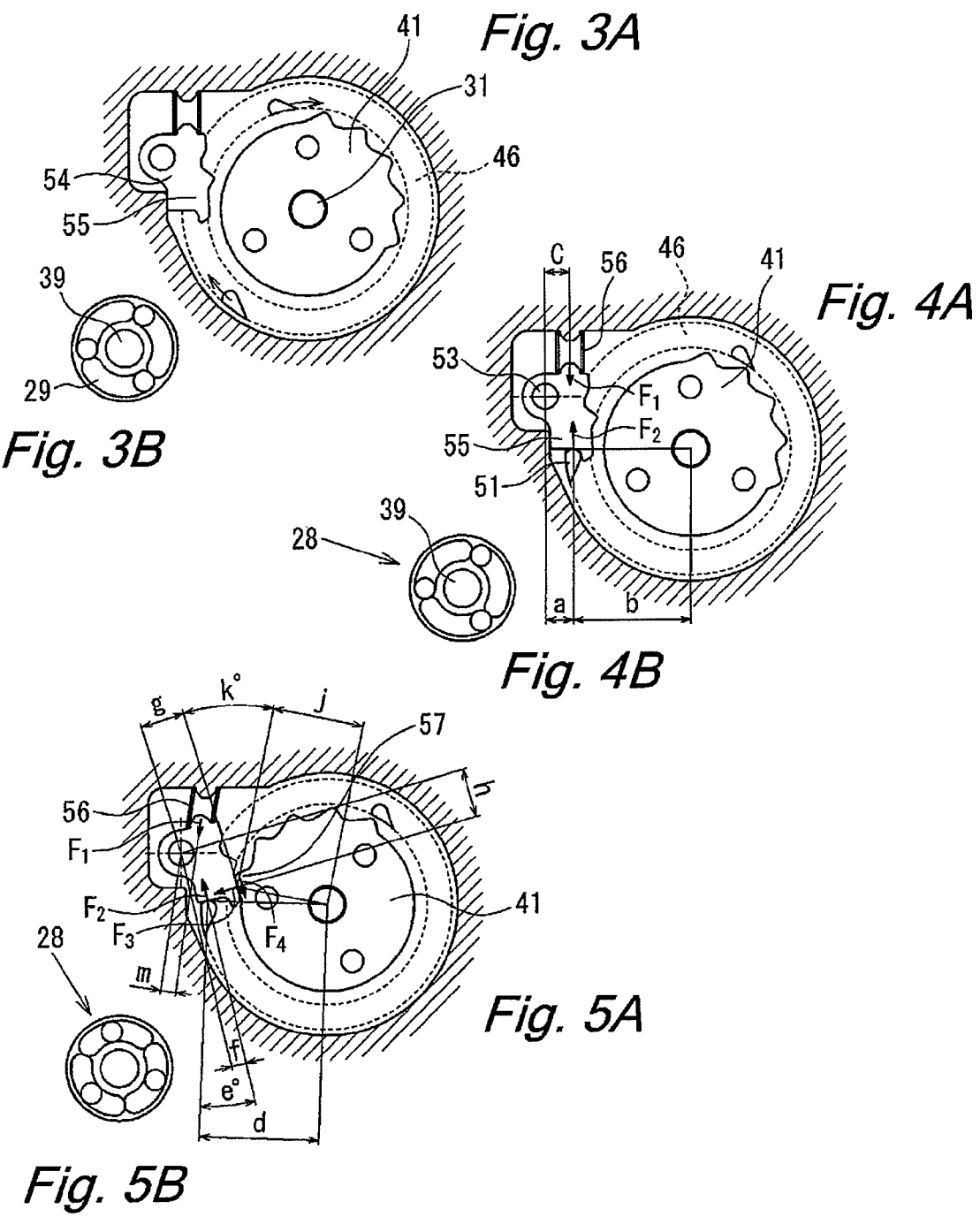

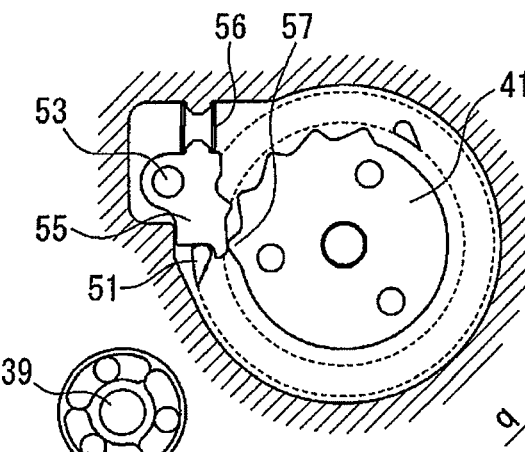
Fig. 6A
Fig. 6B
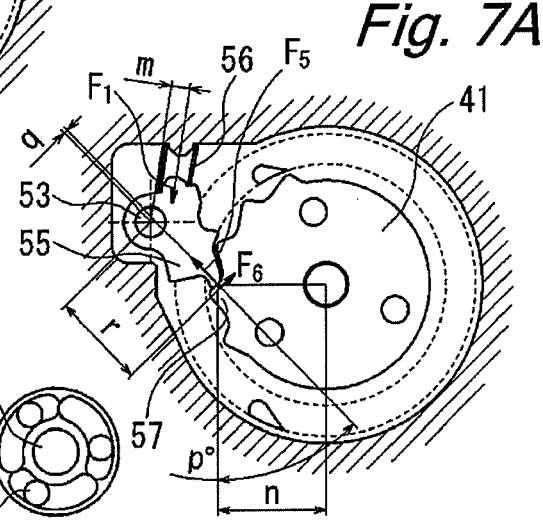
Fig. 7A
Fig. 7B
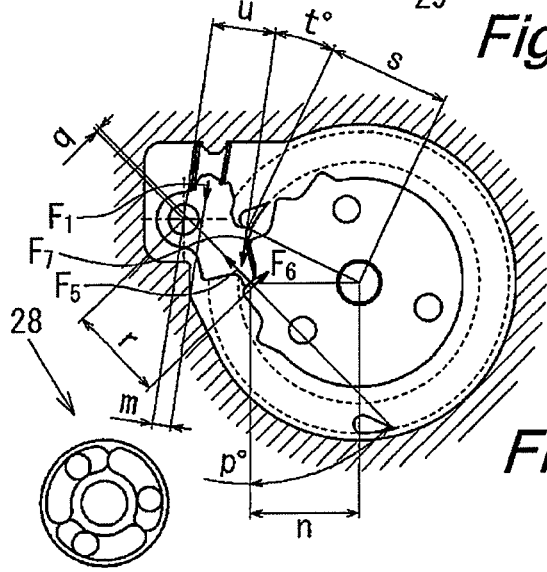
Fig. 8A
Fig. 8B

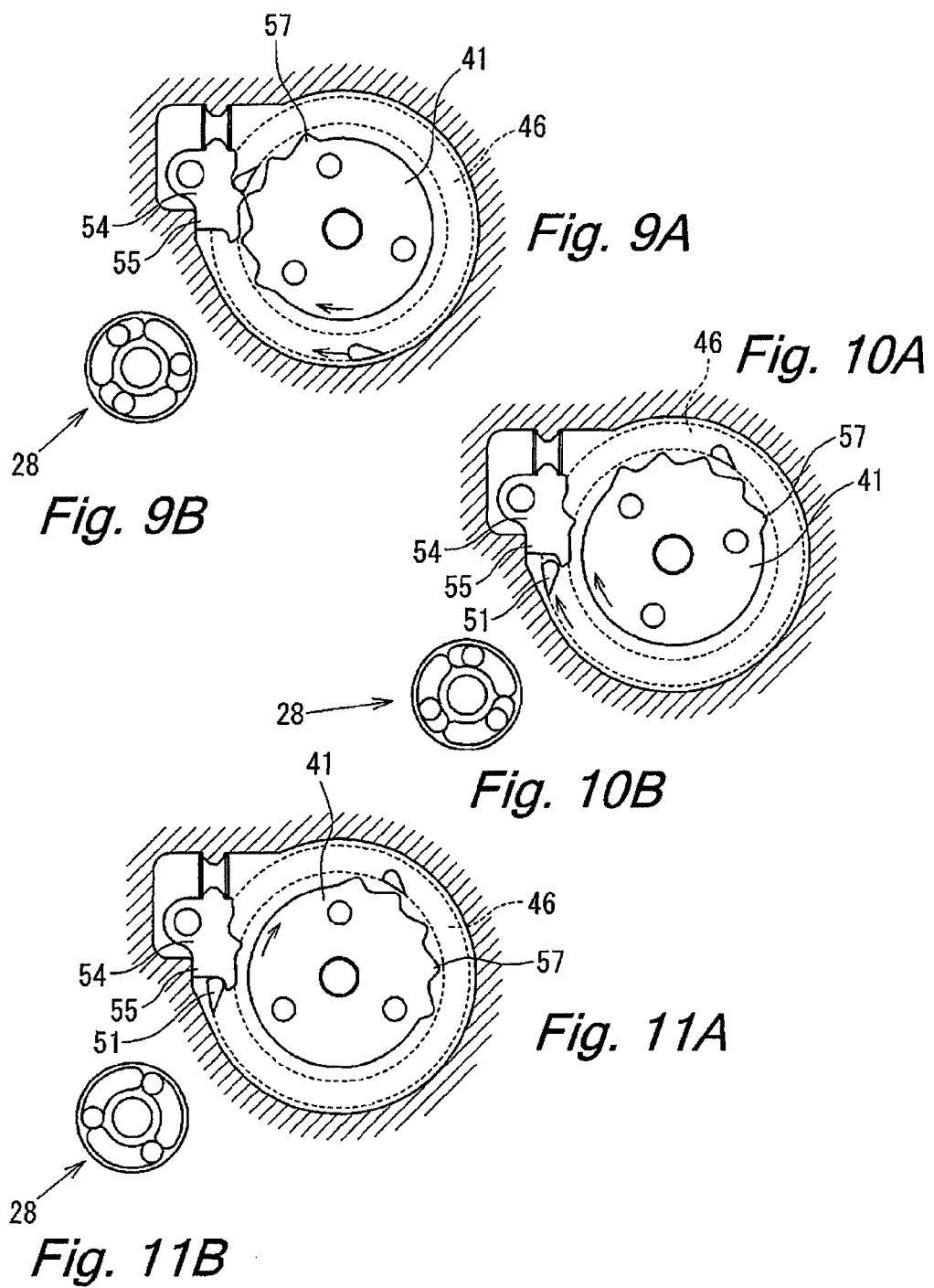

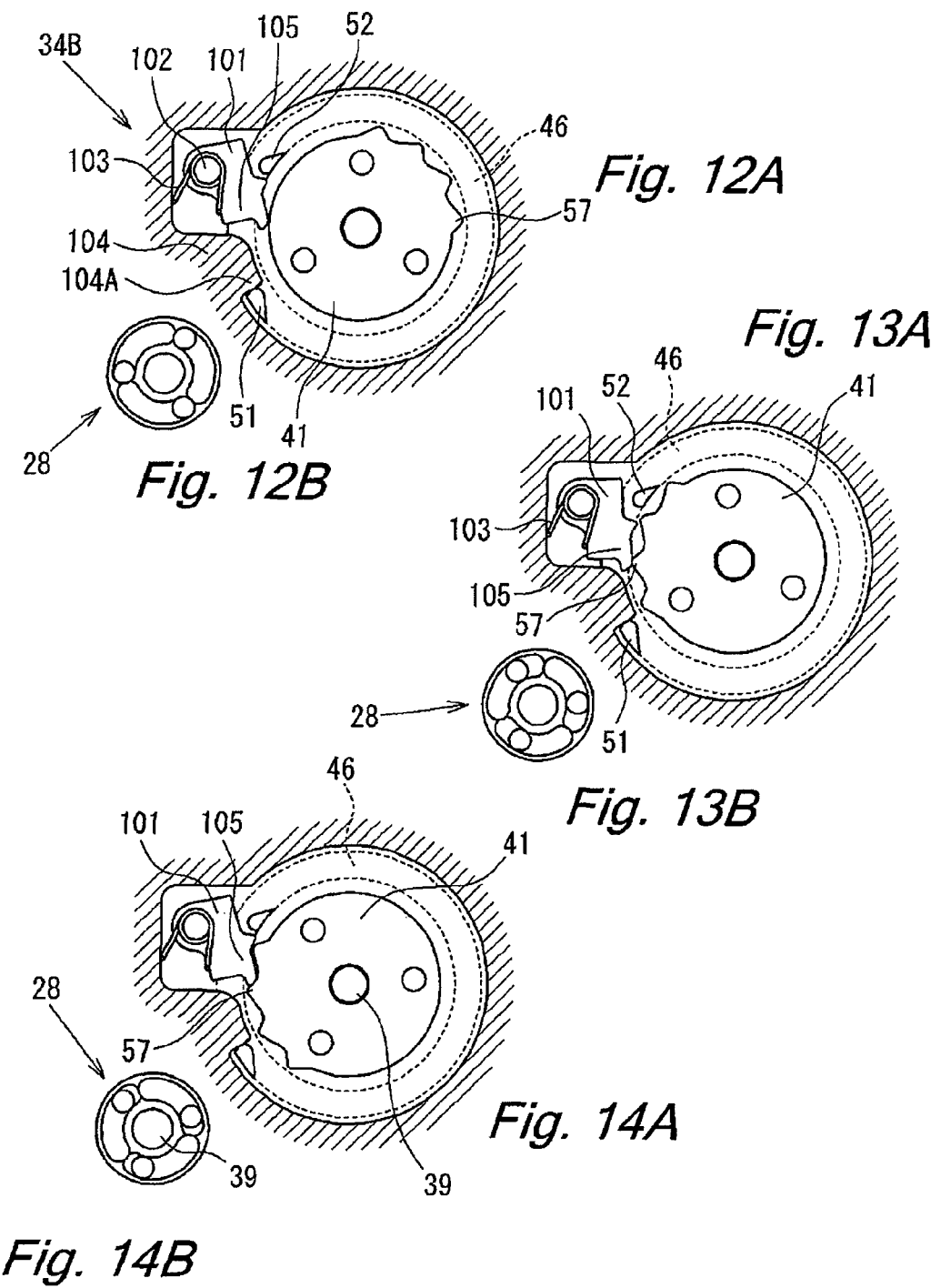

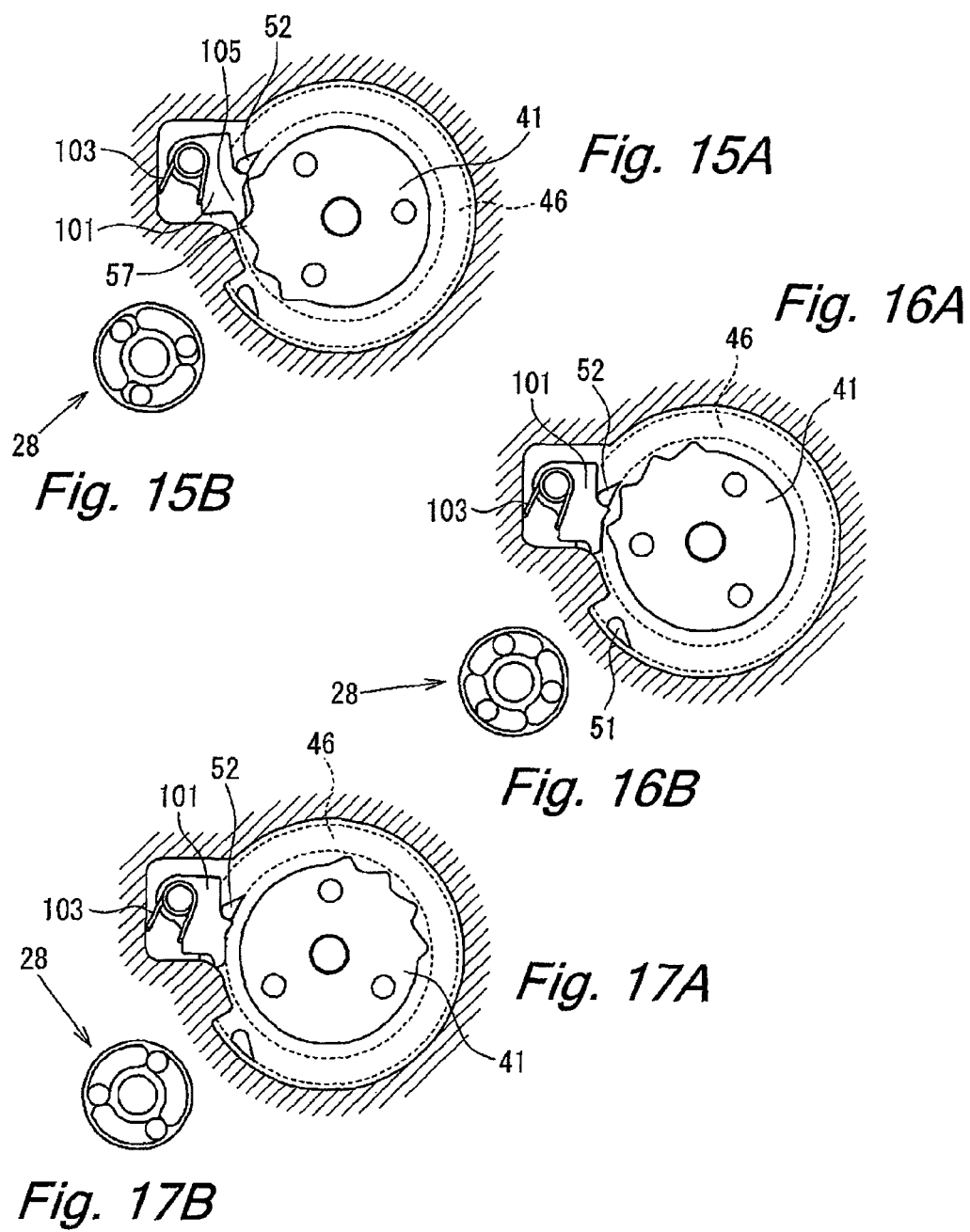

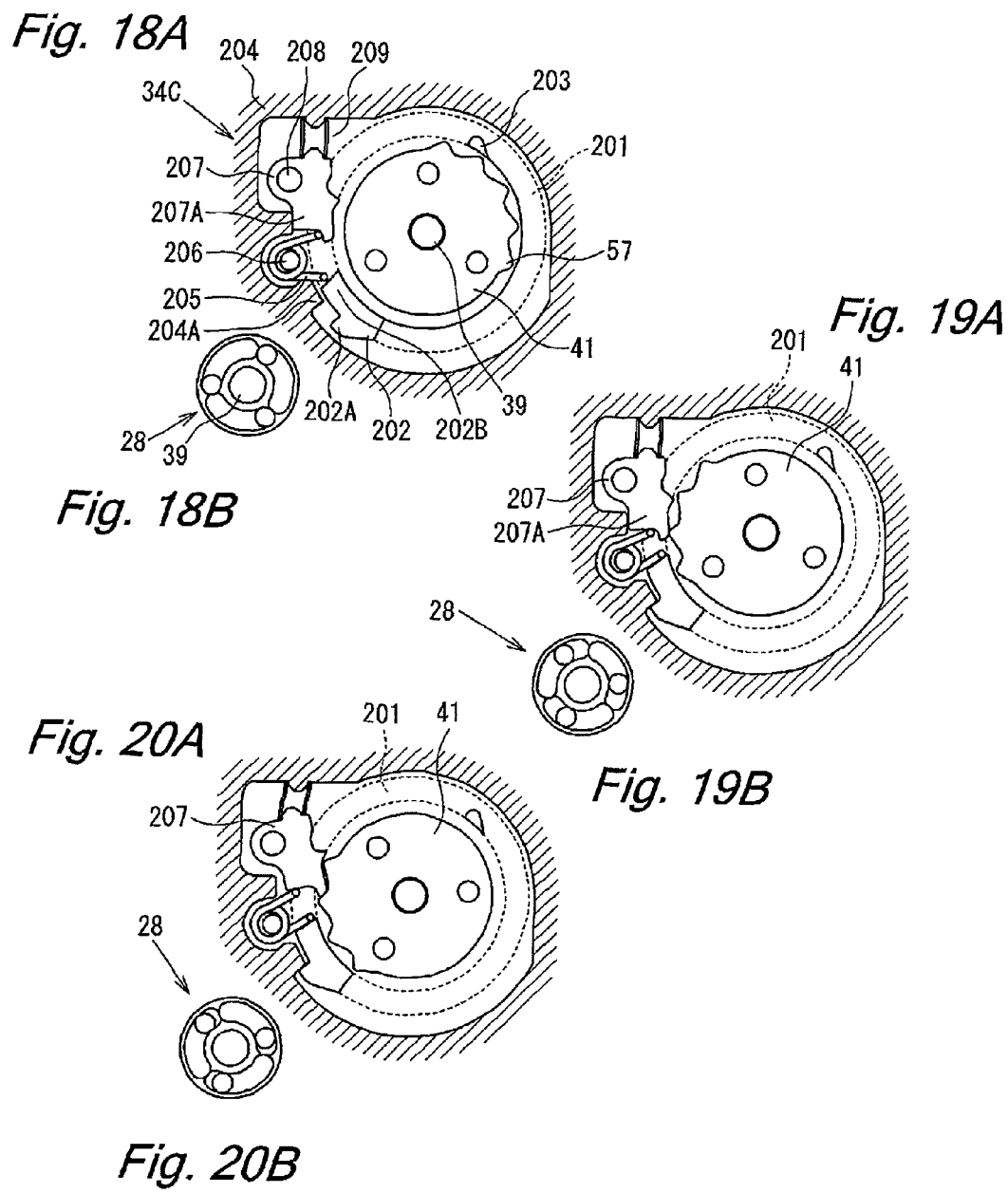

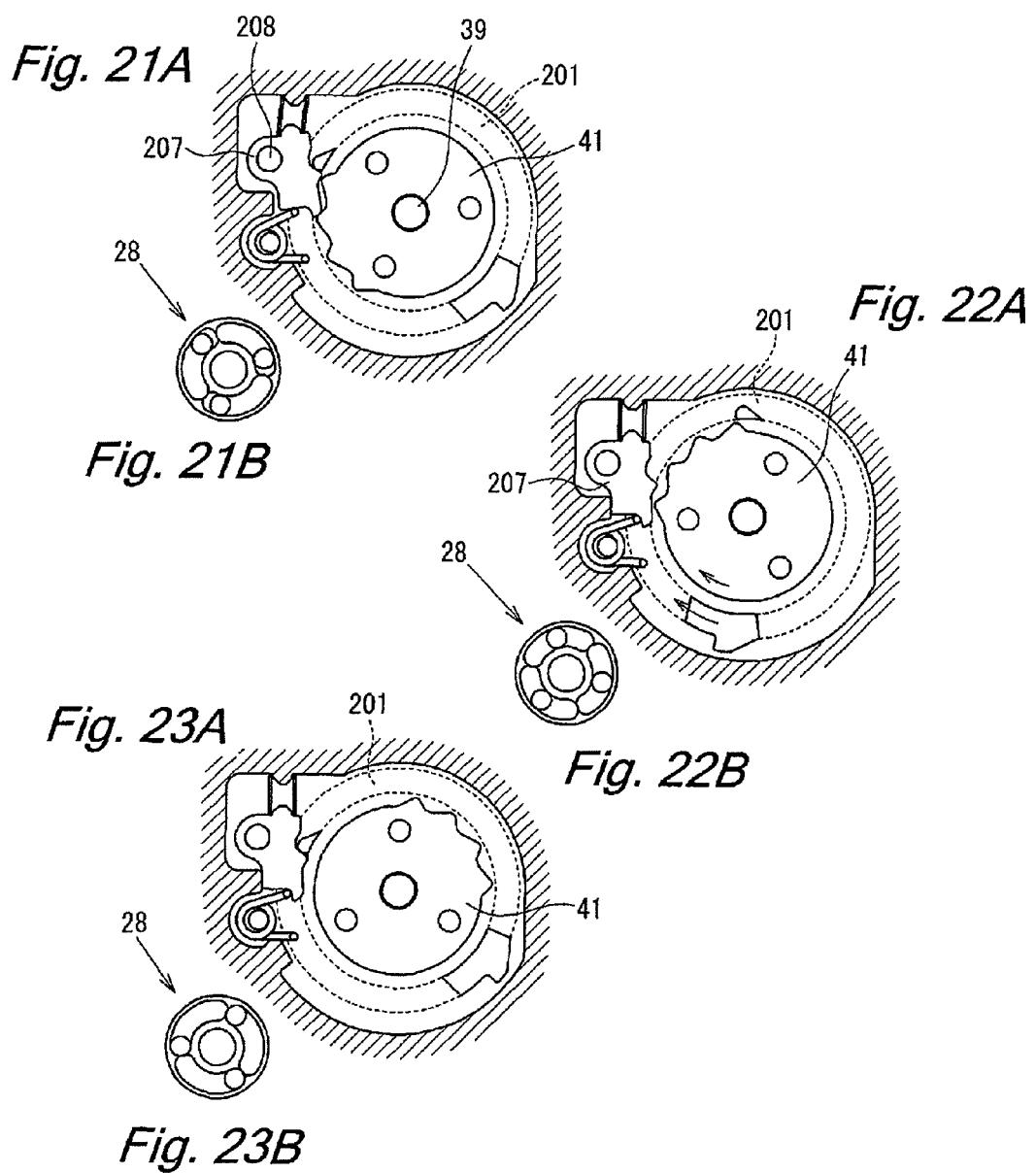

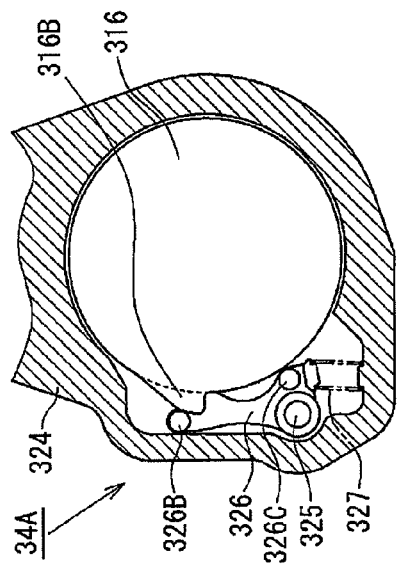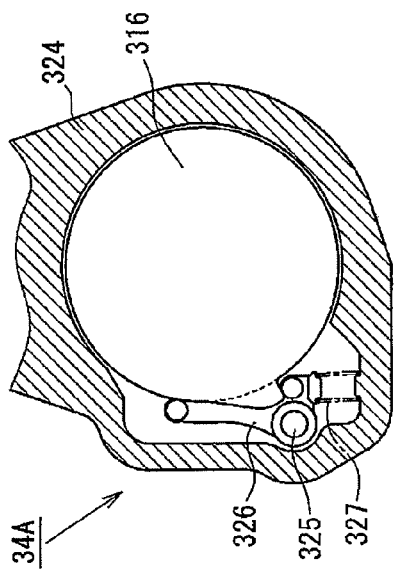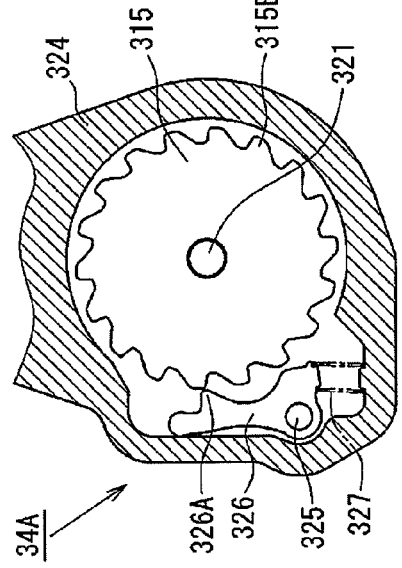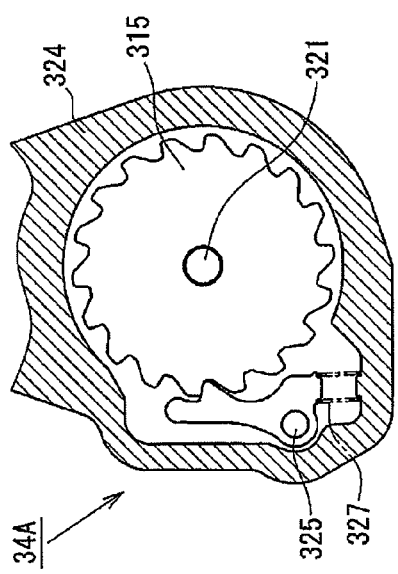

Fig. 27
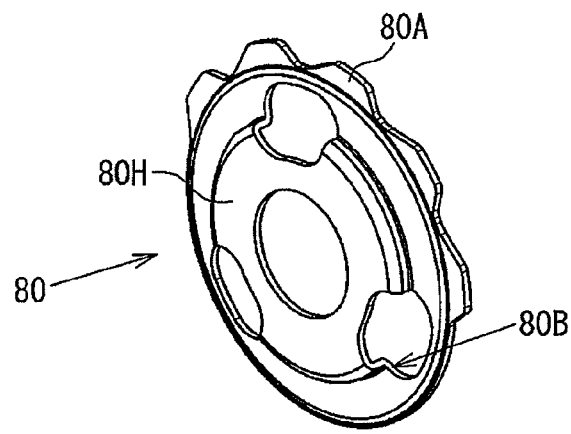
Fig. 28A
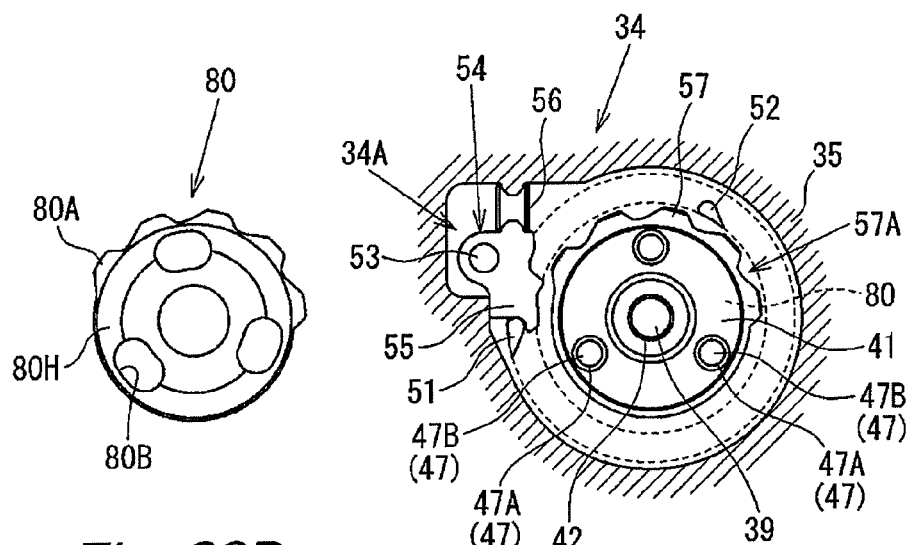
Fig. 28B

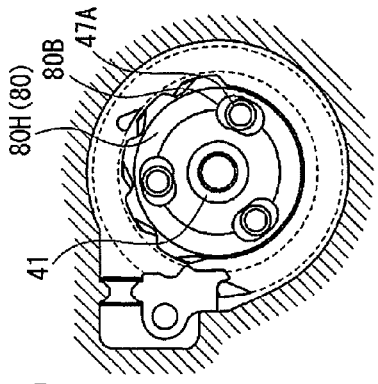
Fig. 29A
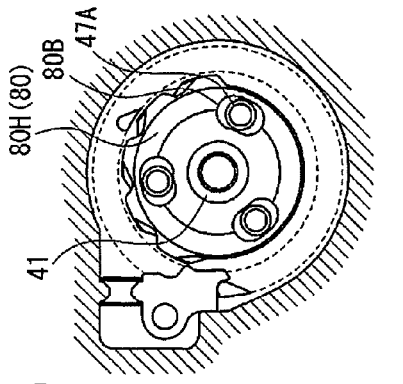
Fig. 29B
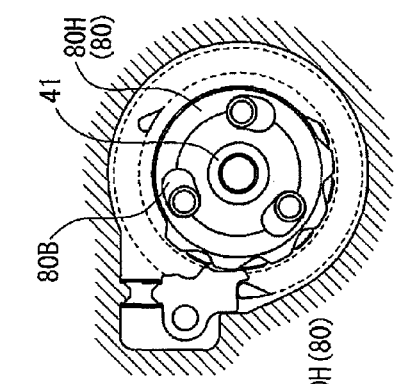
Fig. 29C
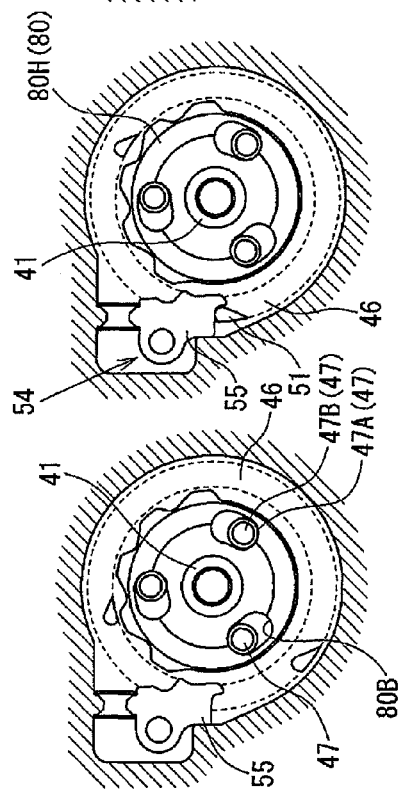
Fig. 29D
Fig. 29E
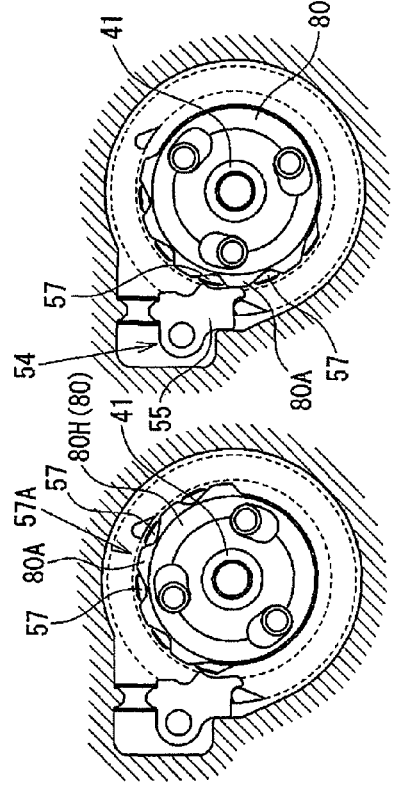
Fig. 29F

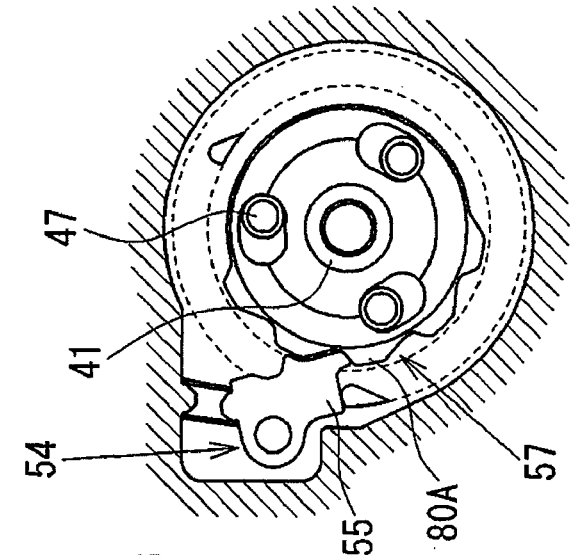
Fig. 29G  Fig. 29H  Fig. 29I
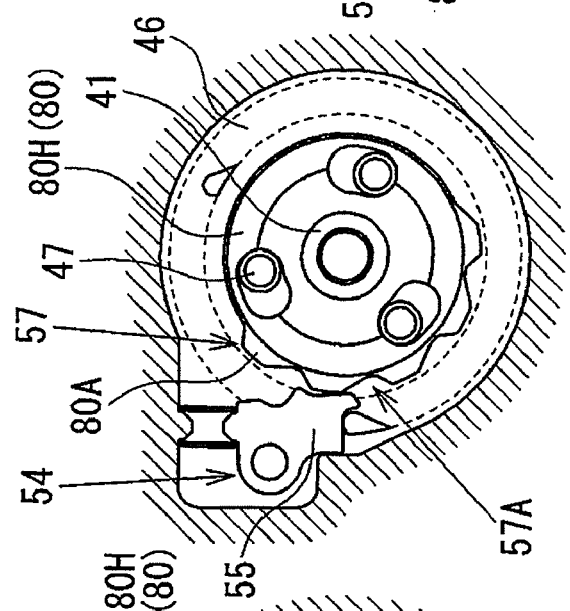
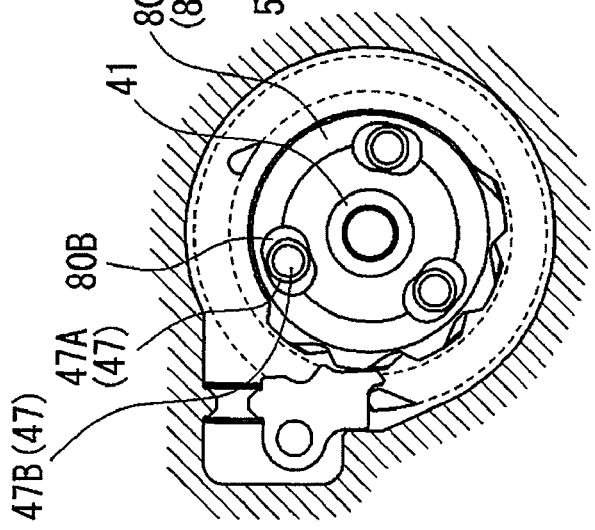

DISK BRAKE

BACKGROUND OF THE INVENTION

The present invention relates to a disk brake for use in braking a vehicle.

Some disk brakes employ a worm speed reducer for self-holding of a brake force to realize the parking brake function (refer to Japanese Patent Application Public Disclosure No. 2006-177532).

SUMMARY OF THE INVENTION

Disadvantageously, the above-mentioned conventional art has poor responsiveness due to use of a worm speed reducer for self-holding of a brake force. One object of the present invention is to provide a disk brake having excellent responsiveness.

According to one aspect of the present invention is a disk brake comprising:

a pair of pads disposed on the respective sides of a disk;

a piston adapted to press at least one of the pair of pads against the disk;

a caliper body including a cylinder capable of containing the piston such that the piston is movable in the cylinder, the caliper body adapted to advance the piston by a supply of a fluid pressure into the cylinder;

an electric motor disposed at the caliper body; and a parking brake mechanism disposed at the caliper body, the parking brake mechanism operable to advance the piston based on a rotation of the electric motor and maintain the advanced piston at a parking brake applying position, the parking brake mechanism comprising a speed reducing mechanism for increasing a rotational force from the electric motor, a rotation/linear motion converting mechanism for converting a rotation of the speed reducing mechanism into a linear motion, and a rotation preventing mechanism for preventing a rotation of the speed reducing mechanism in a direction causing the piston to return, the speed reducing mechanism comprising an input member adapted to rotate in response to an input from the motor, and a pair of output members adapted to rotate in opposing directions so as to increase a rotational input from the input member to provide a rotational output, the speed reducing mechanism constituted by an input-output coaxial type speed reducer in which the pair of output members and the input member are coaxially disposed;

wherein one output member of the pair of output members transmits a rotation to the rotation/linear motion converting mechanism;

the rotation preventing mechanism prevents a rotation of the one output member in the direction causing the piston to return;

the other output member of the pair of output members rotates by a predetermined range to act on the rotation preventing mechanism; and when the motor causes the input member to rotate so that the piston moves in a return direction, a rotation of the other output member according to the rotation of the input member releases rotation prevention of the rotation preventing mechanism to the one output member.

BRIEF DESCRIPTION OF THE DRAWINGS

FIGS. 2A, 2B and 2C are partial cross-sectional views of the disk brake shown in FIG. 1; and in particular, FIG. 2A, FIG. 2B, and FIG. 2C are cross-sectional views taken along the line indicated by the arrows B-B, the line indicated by the arrows A-A, and the line indicated by the arrows C-C in FIG. 1, respectively;

FIGS. 3A-11B illustrate the operation of the disk brake shown in FIG. 1, and in particular, FIGS. 3A, 4A, 5A, 6A, 7A, 8A, 9A, 10A and 11A are cross-sectional views of the disk brake in operation states different from one another, taken along the line indicated by the arrows B-B in FIG. 1; FIGS. 3B, 4B, 5B, 6B, 7B, 8B, 9B, 10B and 11B are cross-sectional views corresponding to FIGS. 3A, 4A, 5A, 6A, 7A, 8A, 9A, 10A and 11A, respectively, taken along the line indicated by the arrows A-A in FIG. 1;

FIGS. 12A-17B illustrate the operation of a disk brake according to a second embodiment of the present invention; and in particular, FIGS. 12A, 13A, 14A, 15A, 16A and 17A are cross-sectional views of the disk brake in operation states different from one another, taken along the line indicated by the arrows B-B in FIG. 1 as a reference figure ("FIG. 1 as a reference figure" is hereinafter referred to as just "FIG. 1"); FIGS. 12B, 13B, 14B, 15B, 16B and 17B are cross-sectional views corresponding to FIGS. 12A, 13A, 14A, 15A, 16A and 17A, respectively, taken along the line indicated by the arrows A-A in FIG. 1;

FIGS. 18A-23B illustrate the operation of a disk brake according to a third embodiment of the present invention; and in particular, FIGS. 18A, 19A, 20A, 21A, 22A and 23A are cross-sectional views of the disk brake in operation states different from one another, taken along the line indicated by the arrows B-B in FIG. 1 as a reference figure ("FIG. 1 as a reference figure" is hereinafter referred to as just "FIG. 1"); and FIGS. 18B, 19B, 20B, 21B, 22B and 23B are cross-sectional views corresponding to FIG. 18A, 19A, 20A, 21A, 22A and 23A, respectively, taken along the line indicated by the arrows A-A in FIG. 1;

FIGS. 25A-25D illustrate the operation of the disk brake shown in FIG. 24; and in particular, FIG. 25A is a cross-sectional view of the disk brake in a certain operation state, taken along the line indicated by the arrows B-B in FIG. 24; FIG. 25B is a cross-sectional view corresponding to FIG. 25A, taken along the line indicated by the arrows A-A in FIG. 24; FIG. 25C is a cross-sectional view of the disk brake in a operation state different from that of FIG. 25A, taken along the line indicated by the arrows B-B in FIG. 24; and FIG. 25D is a cross-sectional view corresponding to FIG. 25C, taken along the line indicated by the arrows A-A in FIG. 24;

FIG. 27 is a perspective view illustrating the shutter shown in FIG. 26;

FIGS. 28A and 28B illustrate the members used in the disk brake shown in FIG. 26; and in particular, FIG. 28A schematically illustrates the portion of the line B-B in FIG. 26, and FIG. 28B is a plan view illustrating the shutter shown in FIG. 26;

FIGS. 29A-29I illustrate the operation of the disk brake shown in FIG. 26; and in particular, FIGS. 29A-29I schematically illustrate the portion of the line B-B in FIG. 26 of the disk brake in operation states different from each other;

DETAILED DESCRIPTION OF THE PREFERRED EMBODIMENT

Figure 1:
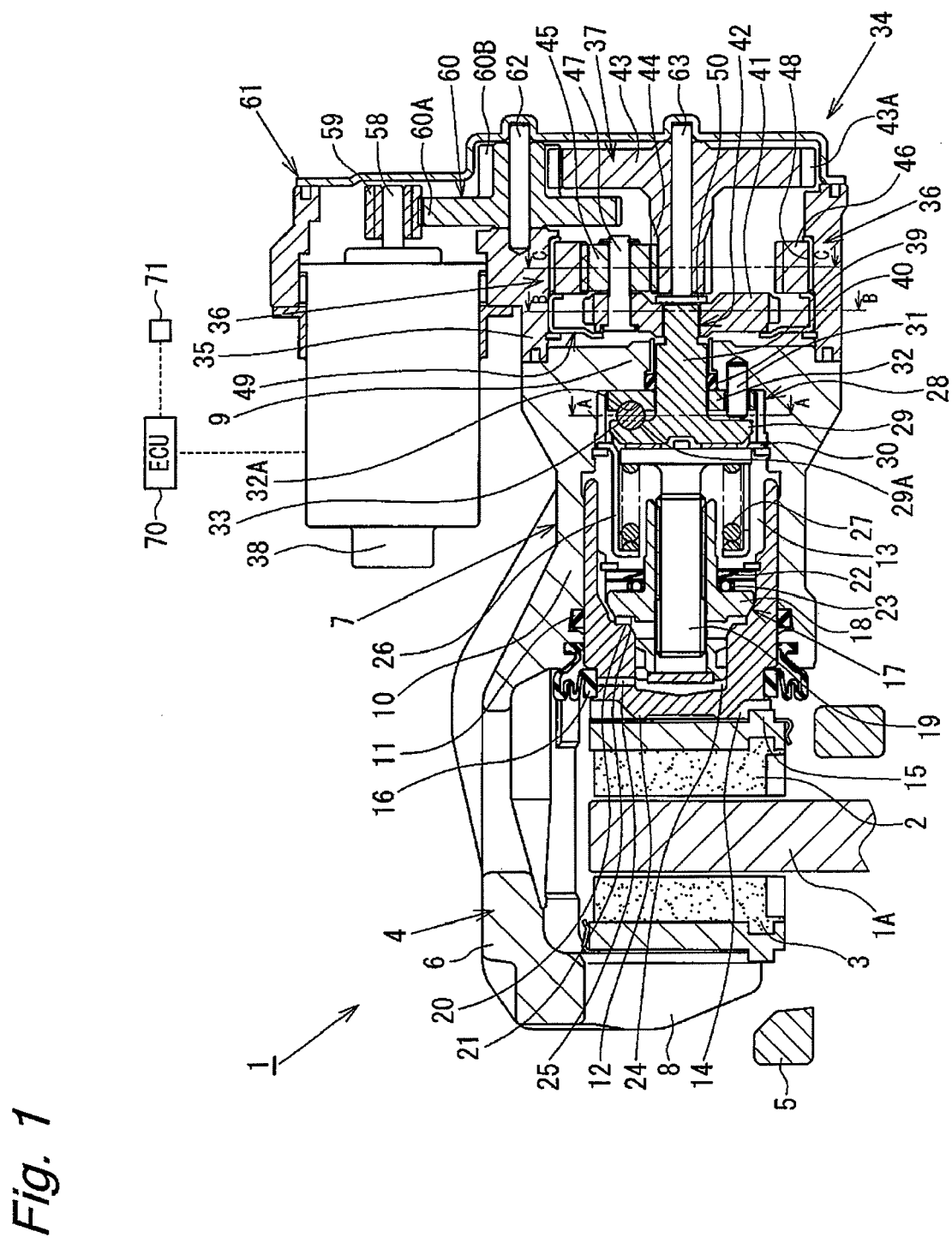
FIG. 1 is a cross-sectional view illustrating a disk brake according to a first embodiment of the present invention.

Hereinafter, a disk brake according to a first embodiment will be described with reference to FIGS. 1 to 11B. FIGS. 1 and 2 show a disk brake 1 according to the present embodiment. In FIGS. 1 and 2, reference numerals 2 and 3 denote a pair of brake pads disposed on the respective sides of a disk rotor 1A attached to a rotational portion of a vehicle so as to sandwich the disk rotor 1A therebetween, and reference numeral 4 denotes a caliper. The disk brake 1 is configured as a floating caliper type disk brake. The pair of brake pads 2 and 3, and the caliper 4 are supported by a carrier 5 fixed to a non-rotational portion of the vehicle such as a knuckle so as to be movable in the axial direction of the disk rotor 1A.

A caliper body 6, which is a main body of the caliper 4, comprises a cylinder portion 7 and a claw portion 8. The cylinder portion 7 is formed at the proximal end side of the caliper body 6 which faces the inner pad 2 or the brake pad of the inner side of the vehicle, and the claw portion 8 is formed at the distal end side of the caliper body 6 which faces the outer pad 3 or the brake pad of the outer side of the vehicle. The cylinder portion 7 comprises a bottomed cylinder 10 having an opening on the side near the inner pad 2 and a bottom closed by a bottom wall 9 at the other end. A piston 12 is disposed in the cylinder 10 so as to be movable while in contact with the cylinder 10 via a piston seal 11. The piston 12 has a cupped shape, and is contained in the cylinder 10 such that the bottom of the piston 12 faces the inner pad 2. A fluid pressure chamber 13 is defined by a space between the piston 12 and the bottom wall 9 of the caliper body 6. A fluid pressure is supplied from a not-shown fluid pressure source such as a master cylinder through a not-shown port formed at the cylinder portion 7 into the fluid pressure chamber 13. In the present embodiment, the fluid pressure source is embodies by, for example, a master cylinder. The piston 12 is prevented from rotating due to the engagement of a protrusion 15 formed on the back face of the inner pad 2 with a recess 14 formed on the bottom face of the piston 12. A dust boot 16 is disposed between the bottom of the piston 12 and the caliper body 6 for preventing an entry of foreign materials into the cylinder 10.

A housing 35 of a parking brake mechanism 34 is attached to the bottom side of the fluid pressure chamber 13 of the caliper body 6. The housing 35 contains a motor 38 which is an exemplary embodiment of an electric motor. The housing 35 further contains a spur gear multistage speed reducing mechanism 37 and a planetary gear speed reducing mechanism 36 for increasing a rotational force from a motor 38, and a rotation preventing mechanism 34A.

A ball ramp mechanism 28 and a pad wear adjusting mechanism 17 are disposed at the caliper body 6. The ball ramp mechanism 28 converts a rotational movement provided from the motor 38 through the planetary gear speed reducing mechanism 36 into a movement in the linear direction (hereinafter referred to as "linear movement" or "linear motion" as appropriate), and provides the converted movement to the piston 12 to displace the piston 12. The pad wear adjusting mechanism 17 adjusts the position of the piston 12 according to a wear state of the brake pads 2 and 3. In the present embodiment, the spur gear multistage speed reducing mechanism 37 and the planetary gear speed reducing mechanism 36 constitute a speed reducing mechanism, and the ball ramp mechanism 28 constitutes a rotation/linear motion converting mechanism. The pad wear adjusting mechanism 17 comprises an adjusting nut 18 and a push rod 19. The adjusting nut 18 is rotatably fitted in the piston 12, and has a frictional surface 21 frictionally engageable with a tapered frictional surface 20 formed at the piston 12. The frictional surface 21 of the adjusting nut 18 is pressed against the frictional surface 20 of the piston 12 by a disc spring 22 and a thrust bearing 23. The tip of the adjusting nut 18 is air-tightly fitted in a chamber 24 formed at the bottom of the piston 12 so as to be movable while in contact with the chamber 24. The chamber 24 is open to the atmosphere through a passage 25 and the dust boot 16.

The push rod 19 has one end screwed into the adjusting nut 18, and the other end configured to be guided by a retainer 26 so as to be movable in the axial direction of the cylinder 10, and the rotation of the push rod 19 around the axis thereof is prevented. The push rod 19 is pressed through a thrust washer 30 against a rotation/linear motion plate 29 of the ball ramp mechanism 28 as a rotation/linear motion converting mechanism, by the spring force of a coil spring 27 applied toward the bottom side of the cylinder 10. The adjusting nut 18 and the push rod 19 are screwed with each other by means of a multiple thread screw, and conversion from/to a rotation to/from a linear movement (also referred to as "linear motion" as appropriate) is possible therebetween. A predetermined built-in clearance is provided between the adjusting nut 18, which is a multiple thread screw, and the push rod 19, whereby the adjusting nut 18 and the push rod 19 are linearly movable relative to each other by a distance corresponding to the built-in clearance without rotating relative to each other. The spring force of the coil spring 27 is greater than the spring force of the disc spring 22.

The ball ramp mechanism 28 comprises a rotation/linear motion plate 29 supported so as to be movable in the axial direction and rotatable around the axis thereof, and a fixed plate 32 supported in the axial direction by the bottom wall 9 of the cylinder 10 and prevented from rotating by a pin 31. Pluralities of circular arc-like inclined ball grooves 29A and 32A are formed on the opposing surfaces of the rotation/liner motion plate 29 and the fixed plate 32. Balls 33 respectively made of steel balls are disposed between the ball grooves 29A and 32A. When the rotation/linear motion plate 29 rotates, the balls 33 rotate and move between the ball grooves 29A and 32A, whereby the rotation/linear motion plate 29 moves in the axial direction and in the rotational direction. The ball grooves 29A and 32A may be configured such that the inclination degrees thereof vary therealong.

A driving shaft 39 coupled with the rotation/linear motion plate 29 of the ball ramp mechanism 28 penetrates through the bottom of the fluid pressure chamber 13 while the seal 40 provides an air-tight seal therebetween, and extends into the housing 35. A carrier 41 of the planetary gear speed reducing mechanism 36 is attached to the tip of the driving shaft 39 by a spline 42 such that the carrier 41 is movable in the axial direction while in contact with the driving shaft 39 and is prevented from rotating relative to the driving shaft 39. In the present embodiment, the carrier 41 corresponds to a rotator of a speed reducing mechanism.

The planetary gear speed reducing mechanism 36 is constituted by a sun gear 44, planetary gears 45, an internal gear 46, and the carrier 41. The sun gear 44 is disposed at the tip of a second speed reducing gear 43 of the spur gear multistage speed reducing mechanism 37, and configured as an input member in the present embodiment. The planetary gears 45 are meshed with the sun gear 44. The plurality of planetary gears 45 are disposed around the sun gear 44. The internal gear 46 is meshed with each of the plurality of planetary gears 45. The internal gear 46 is disposed on the outer circumferential side of the plurality of planetary gears 45, and configured as the other output member in the present embodiment. The above-mentioned carrier 41 is configured as one output member in the present embodiment. The planetary gears 45 are rotatably supported by pins 47 fixed to the carrier 41. The internal gear 46 is supported by a collar 48 and a retainer 49 so as to be rotatable relative to the housing 35 but not movable in the axial direction while in contact with the housing 35 relative to the housing 35. A movement of the carrier 41 in the axial direction is prevented by a washer 50 disposed between the sun gear 44 and the driving shaft 39, and the retainer 49.

Next, the rotation preventing mechanism 34A will be described. A first protrusion 51 and a second protrusion 52 are formed at the internal gear 46 so as to respectively protrude to the same axial position as that of the carrier 41. In the housing 35, a fixation pin 53 is disposed on the outer circumferential side of the carrier 41, and a lever 54, which is an exemplary embodiment of an engagement member, is supported rotatably relative to the fixation pin 53. A pawl 55 is formed at the lever 54. When the internal gear 46 rotates in the clockwise direction from the state shown in FIG. 2A in which the parking brake is not in operation, the protrusion 51 contacts the pawl 55 which then rotates in the counter-clockwise direction to contact the carrier 41. On the other hand, when the internal gear 46 rotates in the counter-clockwise direction so that the second protrusion 52 contacts the pawl 55, the pawl 55 rotates in the clockwise direction to contact the housing 35.

The first protrusion 51 and the second protrusion 52 are formed so that a predetermined backlash zone for the pawl 55 is provided. In the backlash zone, neither first protrusion 51 nor the second protrusion 52 contact the pawl 55. A preload is set to the lever 54 such that the lever 54 contacts the housing 35 by a coil spring 56 disposed between the lever 54 and the housing 35 when the lever 54 contact neither the first protrusion 51 nor the second protrusion 52. A plurality of ratchet teeth 57 configured to be engaged with the pawl 55 are formed along the outer circumference of the carrier 41, and the ratchet teeth 57 are engaged with the pawl 55 when the pawl 55 is at a position such that the pawl 55 contacts the carrier 41. The engagement between the pawl 55 and the ratchet teeth 57 is configured to prevent a rotation of the carrier 41 in the clockwise direction as viewed in FIG. 2A, but allow a rotation in the counter-clockwise direction by the ratchet teeth 57 pushing up the pawl 55.

The spur gear multistage speed reducing mechanism 37 is constituted by a pinion gear 59, a first speed reducing gear 60, and the second speed reducing gear 43. The pinion gear 59 is press-fitted to a shaft 58 of the motor 38. The first speed reducing gear 60 is formed by integrally assembling a large gear 60A meshed with the pinion gear 59 and a small gear 60B disposed axially offset from the large gear 60A. The second speed reducing gear 43 is formed by integrally assembling a large gear 43A meshed with the small gear 60B of the first speed reducing gear 60 and the sun gear 44 of the planetary gear speed reducing mechanism 36. The first speed reducing gear 60 is rotatably supported by the housing 35 and a first shaft 62 fixed to a cover 61. The second speed reducing gear 43 is rotatably supported by a second shaft 63 fixed to the cover 61.

The motor 38 is connected to an ECU 70 constituted by an electronic controller that is control means for performing the drive control of the motor 38. The ECU is connected to a parking switch 71 which is operated for instructing application and release of the parking brake.

The operation of the present embodiment configured as mentioned above will now be described. The disk brake 1 functions as a fluid pressure brake in the following way. Supply of a fluid pressure from the master cylinder (not shown) into the fluid pressure chamber 13 causes the piston 12 to advance while deflecting the piston seal 11. Then, the piston 12 presses the brake pad 2, which is one of the brake pads, against the disk rotor 1A, the reactive force of which displaces the caliper 4 which causes the brake pad 3, which is the other of the brake pads, to be pressed against the disk rotor 1A through the claw portion 8. As a result, a brake force is generated by the brake pads 2 and 3 sandwiching the disk rotor 1A therebetween. Release of the fluid pressure supplied from the master cylinder causes the piston 12 to return to the original position thereof with the aid of the elasticity of the piston seal 11, as a result of which the brake force is released. If the brake pads 2 and 3 have worn and thereby the travel distance of the piston 12 becomes longer, slid is generated between the piston 12 and the piston seal 11, whereby the original position of the piston 12 is displaced and therefore the pad clearance is adjusted to a predetermined amount.

The operation of the parking brake mechanism 34 will now be described with reference to FIGS. 1 to 11B. FIGS. 3A and 3B show the parking brake mechanism 34 in a parking brake releasing state in which the parking brake is not in operation. From this state, upon an operation of the parking switch 71 to actuate the parking brake to create a parking brake applying state, the motor 38 is driven by the ECU 70 and the spur gear multistage speed reducing mechanism 37 and the planetary gear speed reducing mechanism 36 start to rotate. As a result, a torque is provided for a rotation of the carrier 41 in the counter-clockwise direction. However, since an axial force is provided to the ball ramp mechanism 28 by the coil spring 27, the rotation/linear motion plate 29 does not rotate until a predetermined torque is provided. Therefore, the carrier 41 connected to the rotation/linear motion plate 29 through the driving shaft 39 does not rotate, and the internal gear 46 receiving the reactive force of the carrier 41 rotates in the clockwise direction in response to the rotation of the sun gear 44.

As the sun gear 44 further rotates, the first protrusion 51 of the internal gear 46 contacts the pawl 55 of the lever 54, as shown in FIGS. 4A and 4B. At this time, before generation of a brake force F required for the parking brake, a rotation of the lever 54 is caused so that the lever 54 moves to a position enabling engagement of the pawl 55 with the ratchet teeth 57 [FIGS. 5A and 5B]. This is realized in the present embodiment by configuring the shapes of the components and setting the preload to the coil spring 56 so as to satisfy the following conditional expression (2) set based on, for example, the moment around the fixation pin 53 acting on the lever 54. The expression (2) is derived from the transformation of the basic expression (1).

$$F_1 c \leqq F_2 a \tag{1}$$

$$\{aL/(2\pi b\eta)\}\{\eta oio/(1+\eta oio)\}F - F_1 c \geqq 0 \tag{2}$$

In the expressions (1) and (2), the characters and symbols represent the following contents:

$F_1$: force of the coil spring 56
$F_2$: force applied from the first protrusion 51 to the pawl 55
a: distance perpendicular to $F_2$ from the contact portion of the first protrusion 51 to the center of the fixation pin 53
b: distance perpendicular to $F_2$ from the center of the carrier 41 to the contact portion of the first protrusion 51
c: distance perpendicular to $F_1$ from the center of the coil spring 56 to the center of the fixation pin 53
L: lead of the ball ramp mechanism 28
η: mechanical efficiency of the ball ramp mechanism 28
$\eta_0$ efficiency of the mesh of the gears at the planetary gear speed reducing mechanism 36
$i_0$: ratio of the number of the teeth of the sun gear 44 to the number of the teeth of the internal gear 46 (>0)

After the pawl 55 contacts the carrier 41 due to the above-mentioned rotation of the lever 54, the motor 38 is further driven and the sun gear 44 further rotates. Then, as shown in FIGS. 5A and 5B, the ratchet teeth 57 contact the pawl 55. The ratchet teeth 57 is configured to push up the lever 54, and rotate in the counter-clockwise direction as shown in FIGS. 6A and 6B, by configuring the components so as to satisfy the following conditional expression (4) set based on, for example, the moment around the fixation pin 53 acting on the lever 54. The expression (4) is derived from the transformation of the basic expression (3).

$$F_1 m + F_3 h + F_4 g \geqq F_2 f \tag{3}$$

$$F_1 m + \{L/(2\pi\eta)\}[(h+\mu g)/(j\cdot\sin k) - \{f/(d\cdot\cos e)\}\{\eta oio/(1+\eta oio)\}]F \geqq 0 \tag{4}$$

In the expressions (3) and (4), the characters and symbols represent the following contents:

$F_3$: force applied from the ratchet teeth 57 to the pawl 55
$F_4$: frictional force at the contact portion between the ratchet teeth 57 and the pawl 55
d: distance from the contact portion of the first protrusion 51 to the carrier 41
e: angle between the line perpendicular to the line segment from the contact portion of the first protrusion 51 to the center of the carrier 41 and the vectorial direction of $F_2$
f: distance perpendicular to $F_2$ from the contact portion of the first protrusion 51 to the center of the fixation pin 53
g: distance perpendicular to $F_4$ from the contact portion of the ratchet teeth 57 to the center of the fixation pin 53
h: distance perpendicular to $F_3$ from the contact portion of the ratchet teeth 57 to the center of the fixation pin 53
j: distance from the contact portion between the ratchet teeth 57 and the pawl 55 to the center of the carrier 41
k: angle between the line perpendicular to the line segment from the contact portion of the ratchet teeth 57 to the center of the carrier 41 and the vectorial direction of $F_4$
m: distance perpendicular to $F_1$ from the center of the coil spring 56 to the center of the fixation pin 53
μ: frictional coefficient at the contact portion between the ratchet teeth 57 and the pawl 55

After the required brake force F can be obtained by the above-mentioned rotation of sun gear 44, the electric current applied to the motor 38 is reduced, which is supposed to cause the ball ramp mechanism 28 to rotate in the reserve direction due to the reactive force from the brake force. Therefore, the carrier 41 is supposed to rotate in the force reducing direction (clockwise direction) since the torque is applied thereto through the driving shaft 39. However, since the lever 54 still remains in contact with the carrier 41, the pawl 55 remains in contact with the ratchet teeth 57 so that the carrier 41 is stopped, thereby maintaining the brake force (FIGS. 7A and 7B). Satisfaction of the following conditional expression (6) enables the engagement of the pawl 55 and the ratchet teeth 57 to be maintained even after the application of electric current to the motor 38 is stopped. The expression (6) is derived from the transformation of the basic expression (5).

$$F_5 q + F_6 r \geqq F_1 m \tag{5}$$

$$\{L/(2\pi m \cdot \cos p)\}(q+\mu r)F - F_1 m \geqq 0 \tag{6}$$

In the expressions (5) and (6), the characters and symbols represent the following contents:

$F_5$: force applied to the contact portion between the ratchet teeth 57 and the pawl 55
$F_6$: frictional force at the contact portion between the ratchet teeth 57 and the pawl 55
n: distance from the contact portion between the ratchet teeth 57 and the pawl 55 to the center of the carrier 41
p: angle between the line perpendicular to the line segment from the contact portion of the ratchet teeth 57 to the center of the carrier 41 and the vectorial direction of $F_5$
q: distance perpendicular to $F_5$ from the contact portion of the ratchet teeth 57 to the center of the fixation pin 53
r: distance perpendicular to $F_6$ from the contact portion of the ratchet teeth 57 to the center of the fixation pin 53
μ: frictional coefficient at the contact portion between the ratchet teeth 57 and the pawl 55

The ECU 70 determines whether a predetermined thrust force is obtained, based on a monitor value of the electric current applied to the motor 38 (electric current actually flowing to the motor 38). For example, the ECU 70 determines it based on whether the monitor value exceeds an electric current threshold value for the required thrust force. Alternatively, the ECU 70 may determine whether a predetermined thrust force is obtained by counting a change in the electric current at the time of getting over the ratchet teeth 57, and determining whether a count value corresponding to a position generating the predetermined thrust force is obtained.

Upon an operation of the parking brake switch 71 from the parking brake applying state, the parking brake is deactivated, i.e., the parking brake is released in the following way. The ECU 70 operates to apply electric current to the motor 38 so that the motor 38 rotates in the reverse direction of the direction at the time of brake application. At this time, a torque is applied to the carrier 41 for a rotation of the carrier 41 in the clockwise direction, but the carrier 41 does not rotate since it is engaged with the lever 54. On the other hand, the internal gear 46 rotates in the counter-clockwise direction, since the carrier 41 is engaged with the lever 54. Then, as shown in FIGS. 8A and 8B, the second protrusion 52 comes to contact the pawl 55. At this time, as shown in FIGS. 9A and 9B, the second protrusion 52 pushes up the pawl 55 and disengages the pawl 55 from the ratchet teeth 57. This disengagement is realized in the present embodiment by configuring the components so as to satisfy the following conditional expressions (8) and (9) set based on, for example, the moment around the fixation pin 53 acting on the lever 54. First, the conditional expression (8) is satisfied with respect to the moment around the fixation pin 53 of the lever 54. The expression (8) is derived from the transformation of the basic expression (7).

$$F_1 m + F_7 u \geq F_5 g + F_6 r \quad (7)$$

$$(2\pi\eta m/L)F_1 + \{u/(s \cdot \cos t)\}\{\eta oio/(1+\eta oio)\}F' - \{(q+\mu r)/(n \cdot \cos p)\}\{F'+F\} \geq 0 \quad (8)$$

Further, the conditional expression (9) is satisfied, in which $F_{max}$ represents the largest brake force that can be generated by the motor 38 and the parking brake mechanism 34.

$$F_{max} \geq F' \quad (9)$$

In the expressions (7), (8) and (9), the characters and symbols represent the following contents:

$F_7$: force applied to the contact portion between the second protrusion 52 and the pawl 55
s: distance from the contact portion between the second protrusion 52 and the pawl 55 to the center of the carrier 41
t: angle between the line perpendicular to the line segment from the contact portion of the second protrusion 52 to the center of the carrier 41 and the vectorial direction of $F_7$
u: distance perpendicular to $F_7$ from the contact portion of the second protrusion 52 to the center of the fixation pin 53
F': equivalent thrust force obtained by converting, as a thrust force, the absolute value of the torque provided at the motor 38 to release the engagement of the lever 54
F: thrust force generated before release Once the lever 54 is disengaged, the internal gear 46 becomes freely movable in the rotational direction. Thus, the planetary gear speed reducing mechanism 38 does not function as a speed reducer, and both of the internal gear 46 and the carrier 41 rotates in the clockwise direction [FIGS. 10A and 10B] until the protrusion 51 contacts the pawl 55. For example, when the rotational speed of the sun gear 44 by a rotation of the motor 38 is the same as the rotational speed from the ball ramp mechanism 28 in response to a reactive force from brake application, the internal gear 46 has the same rotational speed, and therefore the speed reduction ratio is 1/1. In this way, the internal gear 46 becomes freely movable in the rotational direction and the planetary gear speed reducing mechanism 36 starts to function as though the speed reduction ratio is reduced, whereby the operation time at brake release can be reduced without increasing the rotational speed of the motor 38. After the first protrusion 51 contacts the pawl 55, the planetary gear speed reducing mechanism 36 functions at a predetermined speed reduction ratio [FIGS. 11A and 11B], and the ball ramp mechanism 28 returns to the initial position [FIGS. 3A and 3B], whereby the parking brake release operation is completed.

In the present embodiment, the rotation preventing mechanism 34A prevents a rotation of the carrier 41 (one output member) in the direction causing the piston 12 to return, and the internal gear 46 (the other output member) rotates by a predetermined range and acts on the rotation preventing mechanism 34A. When the motor 38 rotates and thereby the sun gear 44 (input member) rotates such that the piston 12 moves in a return direction, this causes the internal gear 46 to rotate, which causes the rotation prevention of the rotation preventing mechanism 34A applied to the carrier 41 to be released. A worm gear used in the conventional arts to maintain a thrust force (self-holding) has poor mechanical efficiency, and large and unchanged speed reduction ratio. In the present embodiment, parking brake release can be performed without use of such a worm gear. Therefore, it is possible to quickly perform parking brake release and improve the responsiveness to an operation of a driver. As a result, a driver can start to run without delay after parking brake release.

The stop of application of electric current to the motor 38 is determined based on a monitor value of the electric current applied to the motor 38. For determination of the stop of application of electric current to the motor 38, the methods discussed in the following items (i) to (iii) can be employed: (i) determine with use of an electric current threshold value when the ball ramp mechanism 28 is at the initial position; (ii) determine based on whether the electric current change value becomes equal to or less than a threshold value (no change) in the backlash zone until the second protrusion 52 contacts the pawl 55; and (iii) determine based on whether the electric current change value becomes equal to or greater than a threshold value due to a contact of the second protrusion 52 to the pawl 55.

In the present embodiment, the planetary gear speed reducing mechanism 36 is combined with the rotation preventing mechanism 34A. However, the planetary gear speed reducing mechanism 36 may be replaced with another known speed reducing mechanism (having three coaxial input and output axes) such as a cyclo speed reducer, a ball speed reducer, or a harmonic drive.

In the present embodiment, the rotation preventing mechanism 34A is constituted by a ratchet mechanism to maintain a thrust force, and therefore a mechanism having good efficiency can be used as a mechanism for generating a thrust force. That is, energy saving can be accomplished. Therefore, if the present embodiment employs a similar motor to that in the conventional arts, it is possible to reduce the speed reduction ratio compared to the conventional arts. In this case, with a similar response speed, since the motor can have a low rotational speed, it is possible to reduce the operation sound of the gears compared to the conventional arts. If the present embodiment employs a large speed reduction ratio similar to that in the conventional arts, it is possible to reduce the size of the motor compared to the conventional arts.

In the present embodiment, the rotation preventing mechanism 34A is constituted by a ratchet mechanism. Instead of the ratchet mechanism, the rotation preventing mechanism may be constituted by a piece such as a sprag used in a 1-way clutch or a cylindrical mechanism.

Next, a second embodiment will be described with reference to FIGS. 12A to 17B, and returning to FIGS. 1 to 11B if necessary. A main difference between the first embodiment and the second embodiment is that the second embodiment employs a rotation preventing mechanism 34B structurally different from the rotation preventing mechanism 34A employed by the first embodiment. Referring to FIGS. 12A to 17B, the rotation preventing mechanism 34B of the second embodiment comprises a lever 101 rotatably supported by a pin 102 fixed to a housing 104 and provided with a force by a torsion spring 103 for pressing a pawl 105 against the carrier 41. The first protrusion 51 formed at the internal gear 46 is configured to contact a protrusion 104A of the housing 104 when the internal gear 46 rotates in the clockwise direction. On the other hand, the second protrusion 52 is configured to contact the pawl 105 when the internal gear 46 rotates in the counter-clockwise direction, and allow the rotation until the pawl 105 contacts the protrusion 104A of the housing 104. Similarly to the first embodiment, the engagement of the pawl 105 with the ratchet teeth 57 formed at the carrier 41 is configured to prevent a rotation of the carrier 41 in the clockwise direction but allow a rotation thereof in the counter-clockwise direction by the ratchet teeth 57 pushing up the pawl 105.

The rotation preventing mechanism 34B functions as follows. FIGS. 12A and 12B show the parking brake mechanism 34 in a parking brake releasing state in which the parking brake is not in operation. When the parking brake is applied to activate the parking brake, the motor 38 rotates to cause the spur gear multistage speed reducing mechanism 37 and the planetary gear speed reducing mechanism 36 to rotate, and thereby a torque is provided to the carrier 41 for a rotation in the counter-clockwise direction. However, since an axial force is provided to the ball ramp mechanism 28 by the coil spring 27, the rotation/linear motion plate 29 does not rotate until a predetermined torque is provided. Therefore, the carrier 41 connected to the rotation/linear motion plate 29 through the driving shaft 39 doest not rotate. The internal gear 46 rotates in the clockwise direction in response to the rotation of the sun gear 44. After that, the first protrusion 51 contacts the protrusion 104A of the housing 104, a reactive force from which causes the carrier 41 to rotate in the counter-clockwise direction.

As the sun gear 44 further rotates, the ratchet teeth 57 contacts the pawl 105 as shown in FIGS. 13A and 13B. Basically, a required force for the ratchet teeth 57 to push up the lever 101 is only a force for deflecting the torsion spring 103, and therefore always constant regardless the torque of the internal gear 46 and the generated thrust force, similarly to the first embodiment. Therefore, it is possible to further improve transmission efficiency from the motor 38 at the time of application of the parking brake.

After the required brake force is obtained, the application of electric current to the motor 38 is stopped. This stop is supposed to cause the ball ramp mechanism 28 to rotate in the reverse direction in response to the reactive force from the brake force. Therefore, the carrier 41 is supposed to rotate in the brake force reducing direction (clockwise direction as viewed in the figures) through the driving shaft 39, but the engagement of the pawl 105 and the ratchet teeth 57 maintains the brake force as shown in FIGS. 14A and 14B. The operation for applying the parking brake is completed, and the parking brake is now in operation.

When the parking brake is released to deactivate the parking brake, similarly to the first embodiment, a rotation of the motor 38 in the reverse direction of the direction at the time of application of the parking brake results in the second protrusion 52 pushing up the pawl 105, and thus disengagement of the pawl 105 from the ratchet teeth 57, as shown in FIGS. 15A and 15B. The condition for this disengagement of the pawl 105 from the ratchet teeth 57 is basically similar to that in the first embodiment.

Once the engagement of the lever 101 is released, similarly to the first embodiment, the internal gear 46 starts to rotate in the clockwise direction along with the carrier 41, and therefore the second protrusion 52 moves away from the pawl 105 again, and the lever 101 contacts the carrier 41. If the ratchet teeth 57 is there, then the pawl 105 is engaged with the ratchet teeth 57 again. While this engagement and disengagement of the pawl is repeated until the portion having no ratchet tooth 57 arrives, the ball ramp mechanism is returning to the initial position (FIGS. 16A, 16B, 17A, 17B). If the output of the motor 38 is sufficient, the lever 101 can remain pushed up by a continuing contact of the second protrusion 52. Similarly to the first embodiment, the second embodiment enables a quick release of the parking brake, whereby it is possible to improve the responsiveness to an operation of a driver, as a result of which the driver can start to run without delay after parking brake release.

Next, a third embodiment will be described with reference to FIGS. 18A to 23B, and returning to FIGS. 1 to 17B if necessary. A difference between the first embodiment and the third embodiment is that the third embodiment employs a rotation preventing mechanism 34C structurally different from the rotation preventing mechanism 34A employed in the first embodiment. Referring to FIGS. 18A to 23B, a first protrusion 202 and a second protrusion 203 are formed at an internal gear 201 so as to respectively protrude to the same axial position as that of the carrier 41. The first protrusion 202 comprises integrally formed stopper portion 202A and pressing portion 202B. The stopper portion 202A is configured to prevent a rotation by contacting a protrusion 204A of a housing 204. The pressing portion 202B is configured to contact one end of a torsion spring 205. The torsion spring 205 comprises a wound wire portion supported by a pin 206 press-fittedly fixed to the housing 204, and the other end in contact with the lever 207.

In the state that the parking brake is released (FIGS. 18A and 18B), since an arm of the torsion spring 205 near the pressing portion 202B is in contact with the housing protrusion 204, the end thereof is spaced apart from the pressing portion 202B. Therefore, the torsion spring 205 is disposed between the housing protrusion 204A and a lever 207 with a certain torque set thereto, and provides a force for causing the lever 207 to rotate toward the carrier 41. The lever 207 is rotatably supported by a pin 208 fixed to the housing 204, and a preload is set thereto by a coil spring 209 so that a pawl 207A is pressed against the housing 204. As to the moment around the pin 208 applied to the lever 207, in the parking brake releasing state, the moment by the coil spring 209 is larger than the moment by the torsion spring 205, whereby the lever 207 is in contact with the housing 204. However, when the internal gear 201 rotates in the clockwise direction and the stopper portion 202A moves to a position such that the stopper portion 202A contacts the housing protrusion 204A, the moment by the torsion spring 205 exceeds the moment by the coil spring 209, pushing the lever 207 to contact the carrier 41.

The rotation preventing mechanism 34C functions as follows. FIGS. 18A and 18B show the parking brake mechanism 34 in a parking brake releasing state in which the parking brake is not in operation. From this state, upon an operation of the parking switch 71 to actuate the parking brake to create a parking brake applying state, the motor 38 is driven by the ECU 70 and the spur gear multistage speed reducing mechanism 37 and the planetary gear speed reducing mechanism 36 start to rotate. As a result, a torque is provided for a rotation of the carrier 41 in the counter-clockwise direction. However, since an axial force is provided to the ball ramp mechanism 28 by the coil spring 27, the rotation/linear motion plate 29 does not rotate until a predetermined torque is provided. Therefore, the carrier 41 connected to the rotation/linear motion plate 29 through the driving shaft 39 does not rotate, and the internal gear 46 rotates in the clockwise direction in response to the rotation of the sun gear 44. After that, the stopper portion 202A of the first protrusion 202 contacts the protrusion 204A of the housing 204, a reactive force from which causes the carrier 41 to rotate in the counter-clockwise direction. At this time, the lever 207 rotates toward the carrier 41 to contact the carrier 41.

As the sun gear 44 further rotates, the ratchet teeth 57 contact the pawl 207A, as shown in FIGS. 19A and 19B. A required force for the ratchet teeth 57 to push up the lever 207 is basically only a force for deflecting the torsion spring 205, and therefore always constant regardless the torque of the internal gear 46 and the generated thrust force, similarly to the first embodiment. Therefore, it is possible to further improve efficiency at the time of application of the parking brake, similarly to the second embodiment.

After the required brake force is obtained, the application of electric current to the motor 38 is stopped. This stop is supposed to cause the ball ramp mechanism 28 to rotate in the reverse direction in response to the reactive force from the braking force. Therefore, the carrier 41 is supposed to rotate in the brake force reducing direction (clockwise direction) through the driving shaft 39, but the engagement of the pawl 207A and the ratchet teeth 57 maintains the brake force as shown in FIGS. 20A and 20B. The operation for applying the parking brake is now completed.

When the parking brake is released to deactivate the parking brake, similarly to the first and second embodiments, a rotation of the motor 38 in the reverse direction of the direction at the time of application of the parking brake results in the second protrusion 203 pushing up the pawl 107A, and thus disengagement of the pawl 107A from the ratchet teeth 57, as shown in FIGS. 21A and 21B. The condition for this disengagement of the pawl 207A from the ratchet teeth 57 is basically similar to that in the first embodiment.

Once the engagement of the lever 207 is released, the internal gear 201 becomes freely movable in the rotational direction, and therefore the planetary gear speed reducing mechanism 38 does not function as a speed reducer. Similarly to the first embodiment, both of the internal gear 201 and the carrier 41 rotate in the clockwise direction until the stopper portion 202A of the first protrusion 202 contacts the protrusion 204A of the housing 204 [FIGS. 22A and 22B]. In this way, the addition of the torsion spring 205 as a flexible member enables improvement of efficiency at the time of application of the parking brake as mentioned in Modification 1, as well as improvement of the responsiveness at the time of release of the parking brake, i.e., at the time of deactivation of the parking brake as mentioned in the first embodiment.

Next, a fourth embodiment will be described with reference to FIGS. 24 and 25A-25D. Main differences between the first embodiment and the fourth embodiment are as follows; the fourth embodiment employs a ball screw mechanism 301 instead of the ball ramp mechanism (rotation/linear motion converting mechanism) employed in the first embodiment; the fourth embodiment employs a differential gear speed reducing mechanism 302 as a speed reducing mechanism combined with the rotation preventing mechanism 34A; and the fourth embodiment employs a belt speed reducing mechanism 303 as a mechanism for transmitting and amplifying a torque from the motor 38 to the differential gear speed reducing mechanism 302. The rotation preventing mechanism employed in the fourth embodiment is different from the rotation preventing mechanism 34A in the first embodiment, but is denoted by the same reference numeral 34A for convenience of reference. Referring to FIGS. 24 and 25A-25D, the ball screw mechanism 301 comprises a nut 304 contained in the piston 12 so as to be non-rotatable relative to the piston 12, a rod 305 rotatable relative to the cylinder 10, and a plurality of balls 306 which are rolling elements disposed between ball grooves 304A and 305A respectively formed on the opposing surfaces of the nut 304 and the rod 305. The nut 304 is movable while in contact with the piston 12 in the direction of the differential gear speed reducing mechanism 302 in FIG. 24 (right direction in FIG. 24), but is prevented from moving in the direction of the disk rotor 1A (left direction in FIG. 24) because of the contact of the shoulder portion 304B to the piston 12. The rod 305 is configured to receive a thrust force from the piston 12 to the cylinder 10 through a needle thrust bearing 307 and a washer 308. The rod 305 is attached to the cylinder 10 so as to be rotatable relative to the cylinder 10 through a ball thrust bearing 309, a cup 310 and a retaining ring 311.

The differential gear speed reducing mechanism 302 comprises an eccentric shaft 312, a ring-like spur gear 314 rotatably fitted to an eccentric portion 313 of the eccentric shaft 312 and including two external teeth 314A and 314B, a rotational disk 315 including an internal tooth 315A engaged with the external tooth 314A which is one of the external teeth of the spur gear 314, and a rotational disk 316 including an internal tooth 316A engaged with the external tooth 314B which is the other of the external teeth of the spur gear 314. The rotational disks 315 and 316 are respectively supported so as to be rotatable relative to the rotational axis of the eccentric shaft 312. One end of the eccentric shaft 312 extends to the belt speed reducing mechanism 303, and a large pulley 318 is non-rotatably inserted at the tip of the one end through a key 317. The rotational disk 315 and the eccentric shaft 312 are rotatably supported through bearings 319 and 320 relative to the housing 324 formed integrally with the cylinder 10. The rotational disk 315 is non-rotatably coupled at the center thereof with the driving shaft 321 of the rod 305 through, for example, a spline.

This speed reducing mechanism functions in the same manner as a commonly-used planetary gear speed reducing mechanism. A rotation of the eccentric shaft 312 causes the rotational disks 315 and 316 to rotate in the different directions from each other at a predetermined speed reduction ratio. According to this structure, while it is possible to obtain a larger speed reduction ratio than that obtained by the planetary gear speed reducing mechanism used in the first embodiment, it is possible to reduce the number of the components, which is advantageous to cost-saving.

The belt speed reducing mechanism 303 is constituted by a small pulley 322 press-fitted to the shaft 58 of the motor 38, and a belt 323 disposed between the large pulley 318 and the small pulley 322. The belt 323 may be any known belt such as a V belt or a synchronous belt. When the small pulley 322 rotates by an actuation of the motor 38, the large pulley 318 rotates at a predetermined speed reduction ratio (ratio of the diameter of the small pulley 322 to the diameter of the large pulley 318).

Figure 24:
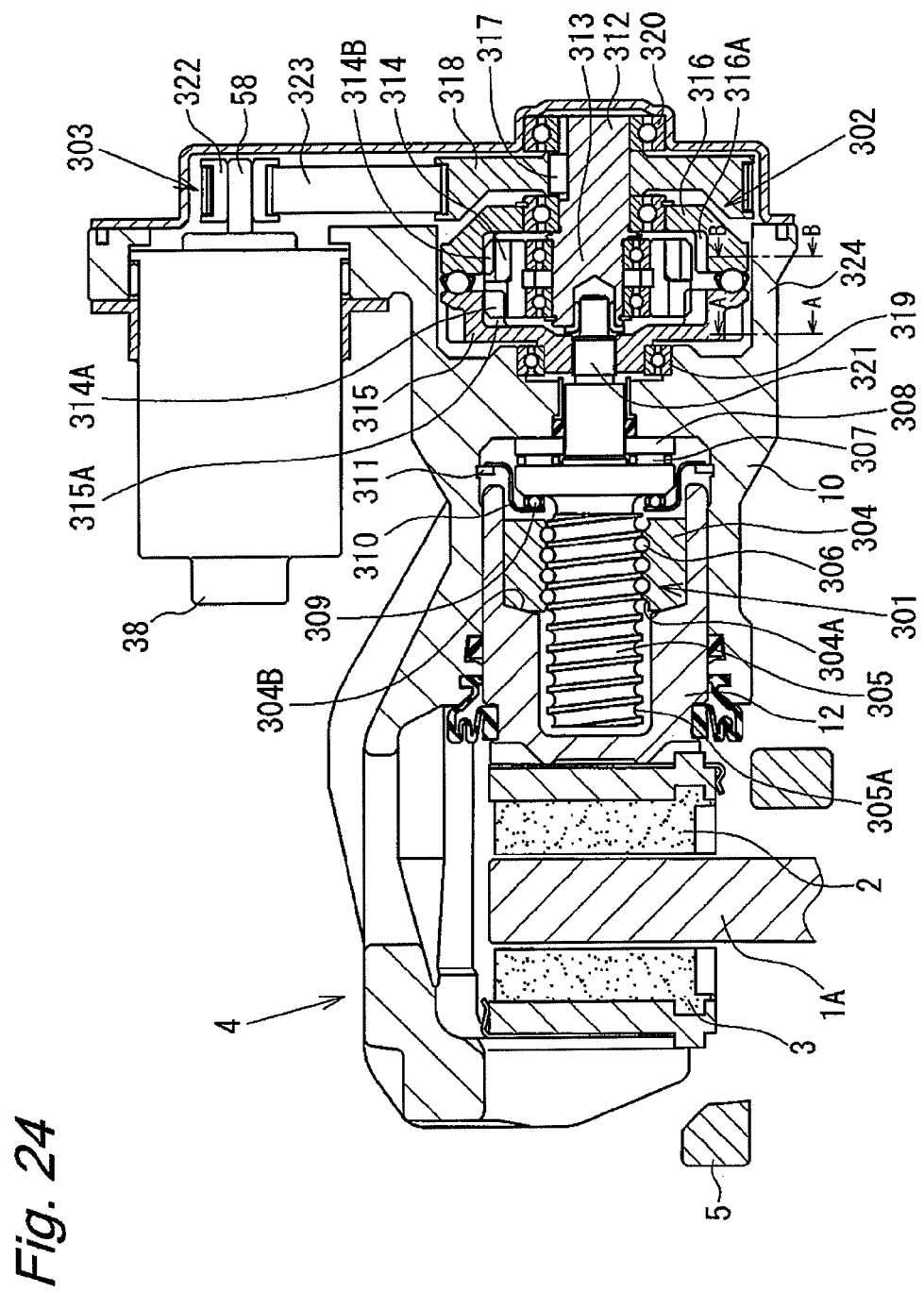
FIG. 24 is a cross-sectional view illustrating a disk brake according to a fourth embodiment of the present invention.

Referring to FIGS. 25A [cross-sectional view taken along the line indicated by the arrows B and B in FIG. 24], 25B [cross-sectional view taken along the line indicated by the arrows A and A in FIG. 24], 25C [cross-sectional view taken along the line indicated by the arrows B and B in FIGS. 24], and 25D [cross-sectional view taken along the line indicated by the arrows A and A in FIG. 24], the rotation preventing mechanism 34A comprises a lever 326 supported so as to be rotatable relative to a pin 325 fixed to the housing 324, and a coil spring 327 for applying a force of pushing a pawl 326A of the lever 326 toward the housing 324. A ratchet portion 315B is formed along the outer circumference of the rotational disk 315 (first disk), and is configured to be engaged with the pawl 326A when the pawl 326A moves toward the rotational disk 315. This engagement prevents a rotation of the rotational disk 315 in the counter-clockwise direction, but allows the rotational disk 315 to rotate in the clockwise direction due to the ratchet teeth pushing up the pawl 326A. A disengagement pin 326B and an engagement pin 326C are formed at the lever 326 so as to extend to reach the outer circumferential side of the rotational disk 316 (second disk). A pin contact portion 316B is formed at the outer circumference of the rotational disk 316.

When the rotational disk 316 rotates in the clockwise direction, the inclined surface of the pin contact portion 316B pushes the disengagement pin 326B, whereby the pawl 326A is disengaged from the ratchet portion 315B, causing the lever 326 to rotate toward the housing 324 [FIGS. 25A and 25B]. On the other hand, when the rotational disk 316 rotates in the counter-clockwise direction, the pin contact portion 316B pushes the engagement pin 326C, causing the lever 326 to rotate to a position establishing the engagement of the pawl 326A with the ratchet portion 315B [FIG. 25C and 25D].

In the fourth embodiment, the rotational disk 315 and the ratchet portion 315B are equivalent to the carrier 41 and the ratchet teeth 57 in the first embodiment. Further, in the fourth embodiment, the contact of the pin contact portion 316B of the rotational disk 316 to the disengagement pin 326B of the lever 326 is equivalent to the contact of the second protrusion 52 of the internal gear 46 to the pawl 55 of the lever 54 in the first embodiment. Further, in the fourth embodiment, the contact of the pin contact portion 316B of the rotational disk 316 to the engagement pin 326C of the lever 326 is equivalent to the contact of the first protrusion 51 of the internal gear 46 to the pawl 55 of the lever 54 in the first embodiment.

According to the fourth embodiment, the rotation/linear motion converting mechanism is constituted only by the ball screw mechanism 301. Therefore, the pad wear compensating mechanism used in the first embodiment becomes unnecessary, resulting in the reduction in the number of the components and simplification of the manufacturing. In addition, the size reduction, especially the axial size reduction is realized, resulting in the reduction in the size of the entire disk brake. The ball screw is employed in the fourth embodiment, but another known highly effective continuous screw such as a precision roller screw may be employed.

Next, a disk brake according to a fifth embodiment will be described with reference to FIGS. 26 to 29G and returning to the first embodiment (FIG. 1) if necessary. Some components of the disk brake of the fifth embodiment are same as the first embodiment, and therefore will not be further described herein for avoiding redundancy.

Figure 26:
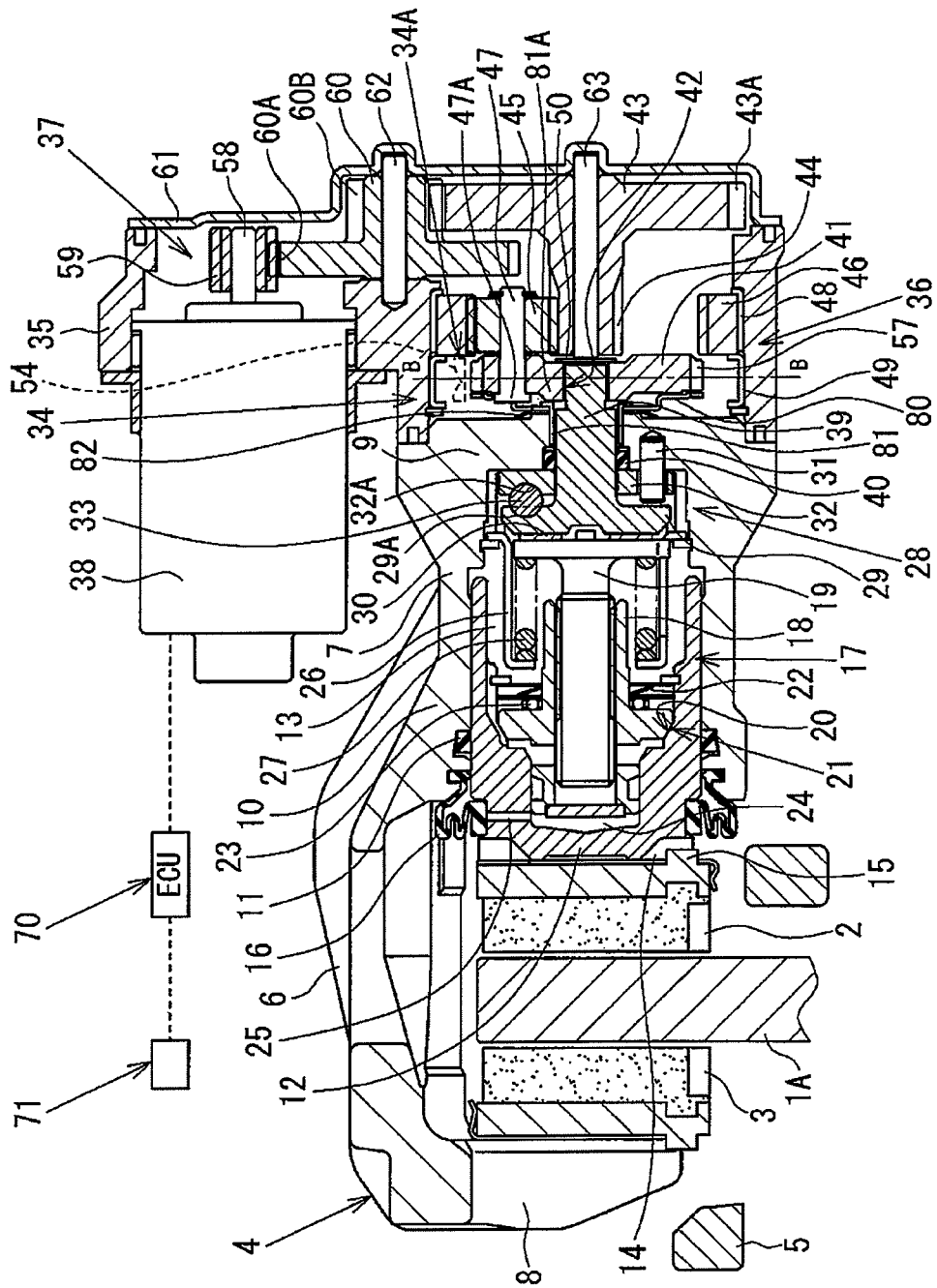
FIG. 26 is a cross-sectional view illustrating a disk brake according to a fifth embodiment of the present invention.
Figure 30:
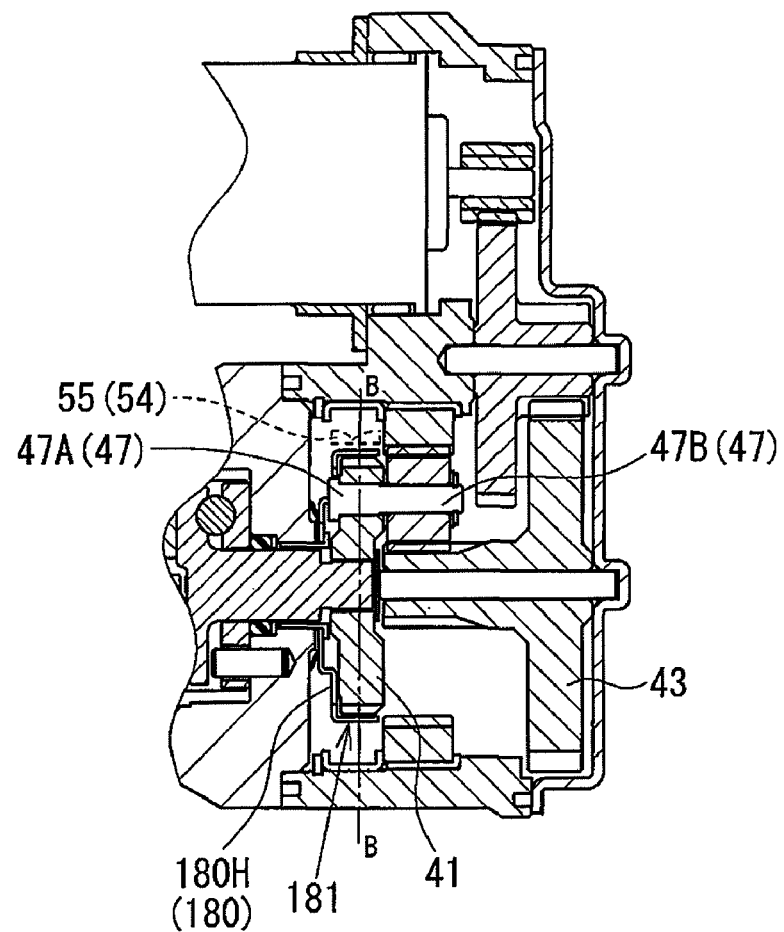
FIG. 30 is a partial cross-sectional view illustrating a disk brake according to a sixth embodiment of the present invention.
Figure 31:
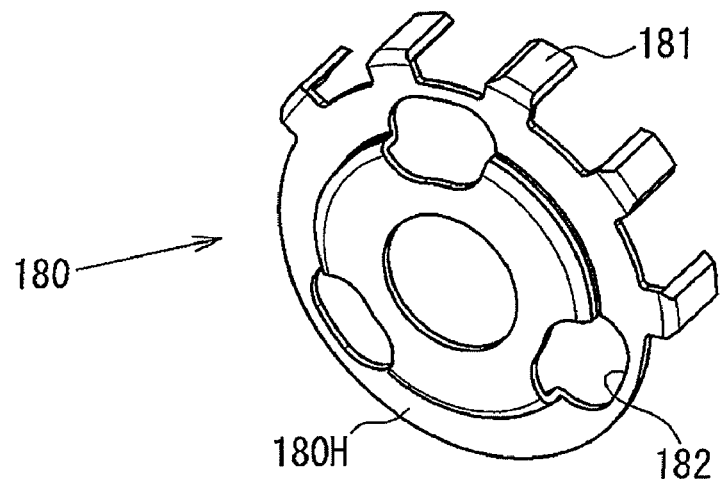
FIG. 31 is a perspective view illustrating the shutter shown in FIG. 30.
Figure 32A:
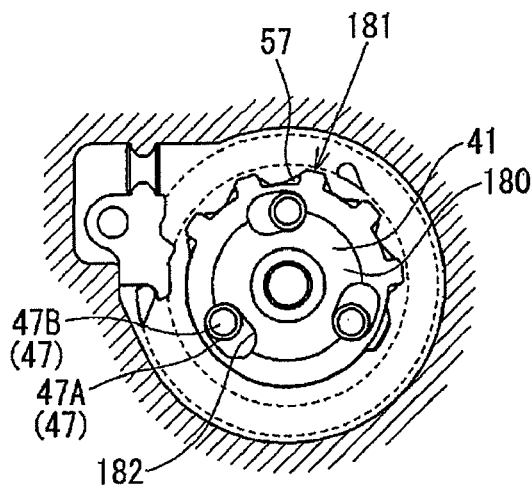
FIGS. 32A and 32B illustrate the operation of the sixth embodiment (FIG. 30); and in particular, FIG. 32A schematically illustrates the portion of the line B-B in FIG. 30 of the disk brake (sixth embodiment) in a certain operation state, and FIG. 32B schematically illustrates the portion of the line B-B in FIG. 30 of the disk brake in a operation state different from that of FIG. 32A.
Figure 32B:
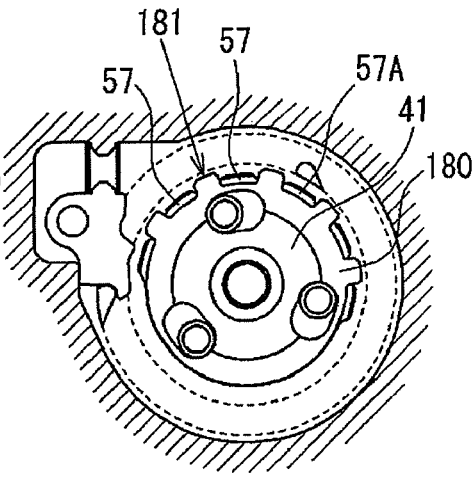

As shown in FIG. 26, in the fifth embodiment, a shutter 80 is disposed adjacent to the carrier 41 so as to be extremely close but non-contactable to the carrier 41. The shutter 80 is rotatably supported by a sleeve 81 fixed to the bottom wall 9 of the cylinder portion 7. A disc spring 82 is disposed between the shutter 80 and the bottom wall 9 of the cylinder portion 7, and urges the shutter 80 toward a flange 81A of the sleeve 81. Therefore, a certain resistance (also referred to as "rotational resistance" as appropriate) is applied to a rotation of the shutter 80

As shown in FIGS. 27 and 28B, the shutter 80 generally comprises a disk-shaped stepped shutter body 80H having a hole (not labeled) at the center thereof, and a plurality of protrusions 80A formed along the outer circumference of the shutter body 80H. The protrusions 80A are formed so as to radially outwardly extend from the shutter body 80H. In the present embodiment, when the protrusions 80A are situated to positions corresponding to gullets 57A defined between adjacent ratchet teeth 57, the gullets 57A are hidden in the axial direction. In other word, the protrusions 80A are aligned with the gullets 57A in the axial direction [the front-back direction of the sheet of FIG. 28A].

Further, the shutter body 80H of the shutter 80 includes a plurality of elongated holes 80B. Heads 47A of pins 47 fixed to the carrier 41 are inserted into the elongated holes 80B with so called backlashes formed therebetween. Due to the backlashes, the shutter 80 is rotatable relative to the carrier 41 by a degree corresponding to the backlashes between the elongated holes 80B and the heads 47A of the pins 47. In FIG. 28A, when the shutter 80 rotates relative to the carrier 41 in the clockwise direction, the protrusions 80A are aligned with the gullets 57A (in other words, face the gullets 57A), and therefore the gullets 57A are hidden. On the other hand, when the shutter 80 rotates relative to the carrier 41 in the counter-clockwise direction, the protrusions 80A are aligned with the ratchet teeth 57, and therefore the gullets 57A are exposed.

A shaft portion constituting the pin 47 along with the head 47A is hereinafter referred to as "pin shaft 47B" for convenience of reference. FIG. 28A is a schematic view taken along line B-B in FIG. 26 as viewed from the right side of FIG. 26 in the left direction. In FIG. 28A, the heads 47A of the pins 47 are situated at the back side of the sheet, and the carrier 41 is situated at the front side of the sheet. The pawl 55 of the lever 54 has an axial width determined so as to be abuttable against the ratchet tooth 57 of the carrier 41 and the protrusion 80A of the shutter 80 at the same time.

The fifth embodiment configured as mentioned above functions as follows. In the fifth embodiment, the operation of the disk brake 1 as a fluid pressure brake is performed in the same manner as that in the first embodiment.

The operation of the parking brake mechanism 34 in the fifth embodiment will be described with reference to FIGS. 29A-29G. FIG. 29A illustrates the parking brake mechanism 34 in a parking brake releasing state in which the parking brake is not in operation. From this state, upon an operation of the parking switch 71 to actuate the parking brake to create a parking brake applying state, the motor 38 is driven by the ECU 70 and the spur gear multistage speed reducing mechanism 37 and the planetary gear speed reducing mechanism 36 start to rotate. As a result, a torque is provided for a rotation of the carrier 41 in the counter-clockwise direction. However, since an axial force is provided to the ball ramp mechanism 28 by the coil spring 27, the rotation/linear motion plate 29 does not rotate until a predetermined torque is provided. Therefore, the carrier 41 connected to the rotation/linear motion plate 29 through the driving shaft 39 does not rotate, and the internal gear 46 receiving the reactive force of the carrier 41 rotates in the clockwise direction in response to the rotation of the sun gear 44.

As the sun gear 44 further rotates, the first protrusion 51 of the internal gear 46 contacts the pawl 55 of the lever 54, as shown in FIG. 29B. Then, since the disk brake 1 in the present embodiment is configured such that the torque required for rotating the ball ramp mechanism 28 is smaller than the torque required for rotating the lever 54, the internal gear 46 stops rotating, and the carrier 41 starts to rotate in the counter-clockwise direction. At this time, the shutter 80 does not rotate due to the rotational resistance provided from the disc spring 82 to the shutter 80, as shown in FIG. 29C. The carrier 41 rotates by a degree corresponding to the backlashes of the elongated holes 80B of the shutter 80. When the heads 47A of the pins 47 abut against the side faces of the elongated holes 80B, the shutter 80 starts to rotate integrally with the carrier 41. At this time, as shown in FIG. 29D, since the protrusions 80A of the shutter 80 are aligned with the gullets 57A between the ratchet teeth 57, the gullets 57A are hidden.

As the motor 38 is driven to further rotate and then a brake force is generated by the operation of the ball ramp mechanism 28, the torque required for rotating the ball ramp mechanism 28 becomes larger than the torque required for rotating the lever 54. Therefore, as shown in FIG. 29E, the lever 54 rotates and the pawl 55 abuts against the carrier 41. At this time, since the protrusions 80A of the shutter 80 are aligned with the gullets 57A between the ratchet teeth 57, the pawl 55 abuts against the protrusion 80A but not abuts against the gullet 57A (does not enter the gullet 57A). Therefore, it is possible to prevent generation of the abutment noise peculiar to a ratchet mechanism when the parking brake is applied. As a result, it is possible to realize a further quiet operation of the disk brake.

Furthermore, in the first embodiment, when the pawl 55 inserted in the gullet 57A gets over the ratchet tooth 57, an additional torque is required for rotating the carrier 41 against the torque from the internal gear 46. On the contrary, in the fifth embodiment, since the pawl 55 does not enter the gullet 57 as mentioned above, a change in the torque when the parking brake is applied can be reduced, and a further reduce in the required torque (high efficiency) and turning down of the gear noise can be realized. This also contributes to a quiet operation of the disk brake.

After the required brake force is obtained (FIG. 29F), the application of electric current to the motor 38 is reduced. This reduce causes the ball ramp mechanism 28 to rotate in the reverse direction in response to the reactive force from the brake force. Therefore, the carrier 41 rotates in the clockwise direction as shown in FIG. 29G, but the shutter 80 does not rotate due to the rotational resistance by the disc spring 82. When the carrier 41 rotates by a degree corresponding to the backlashes of the elongated holes 80B [FIG. 29H], the shutter 80 starts to rotate in the clockwise direction integrally with the carrier 41. At this time, the ratchet teeth 57 and the protrusions 80A of the shutter 80 are aligned, and thereby the gullets 57A are exposed. Since the internal gear 46 also receives the rotational torque in the clockwise direction, when the carrier 41 rotates to a position such that the pawl 55 enters the gullet 57A, the lever 54 rotates, establishing the engagement of the pawl 55 with the ratchet teeth 57. As a result, the carrier 41 stops rotating and the brake force is maintained [FIG. 29I].

The conditional expressions for realizing the release operation and establishing the respective states are the same as those in the first embodiment.

In the fifth embodiment, the gullets 57A are completely hidden by the protrusions 80A of the shutter 80. However, for improving the reliability of the latch function, the protrusions 80A may have shorter circumferential widths so that it is ensured that the pawl 55 enters the gullet 57A, and the shutter 80 and the carrier 41 have a relative rotation when the carrier 41 rotates in the clockwise direction. Furthermore, in the fifth embodiment, a disc spring 82 is used as an element for providing a rotational resistance to the shutter 80. However, another known similar spring such as a wave washer may be employed. Alternatively, instead of adding a component, grease may be applied between the shutter 80 and the carrier 41 (rotator) to provide a resistance (viscous resistance).

Next, a disk brake according to a sixth embodiment will be described with reference to FIGS. 30 to 32B. Since the basic structure and operation of the sixth embodiment are similar to those of the fifth embodiment, only different points will be described in detail below.

As shown in FIGS. 30 to 32B, the sixth embodiment comprises a shutter 180 instead of the shutter 80 in the fifth embodiment. Similarly to the shutter 80 in the fifth embodiment, the shutter 180 is disposed adjacent to the carrier 41. The shutter 180 generally comprises a shutter body 180H similar to the shutter body 80H in the fifth embodiment, and a plurality of flanges 181 formed along the outer circumference of the shutter body 80H instead of the protrusions 80A in the fifth embodiment. The elongated holes formed at the shutter body 180H are referred to as "elongated holes 182" for convenience of reference. The heads 47A of the pins 47 fixed to the carrier 41 are inserted in the elongated holes 182 with so-called backlashes formed therebetween. Due to the backlashes, the shutter 180 and the carrier 41 are rotatable relative to each other by a degree corresponding to the backlashes between the elongated holes 182 and the heads 47A of the pins 47.

The flanges 181 are formed so as to extend perpendicularly to the shutter body 180H, and be radially aligned with the gullets 57A. The protrusions 47A in the fifth embodiment are axially aligned with the gullets 57A as mentioned above (refer to FIGS. 28), and the flanges 181 are different from the protrusions 47A in terms of direction of being aligned with the gullets 57A. According to the sixth embodiment, it is possible to increase the area that abuts against the pawl 55 of the lever 54 when the parking brake is applied, whereby the durability (wear resistance) can be enhanced compared to the fifth embodiment.

Figure 33:
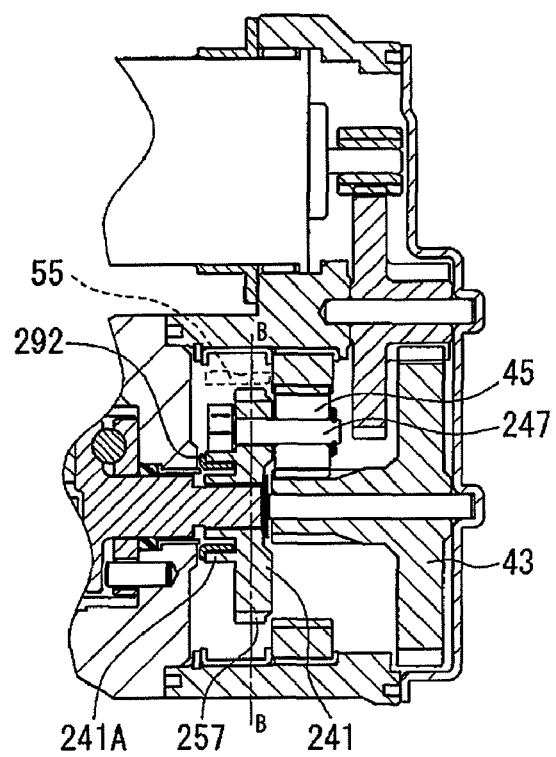
FIG. 33 is a partial cross-sectional view illustrating a disk brake according to a seventh embodiment of the present invention.
Figures 34A, 34B:
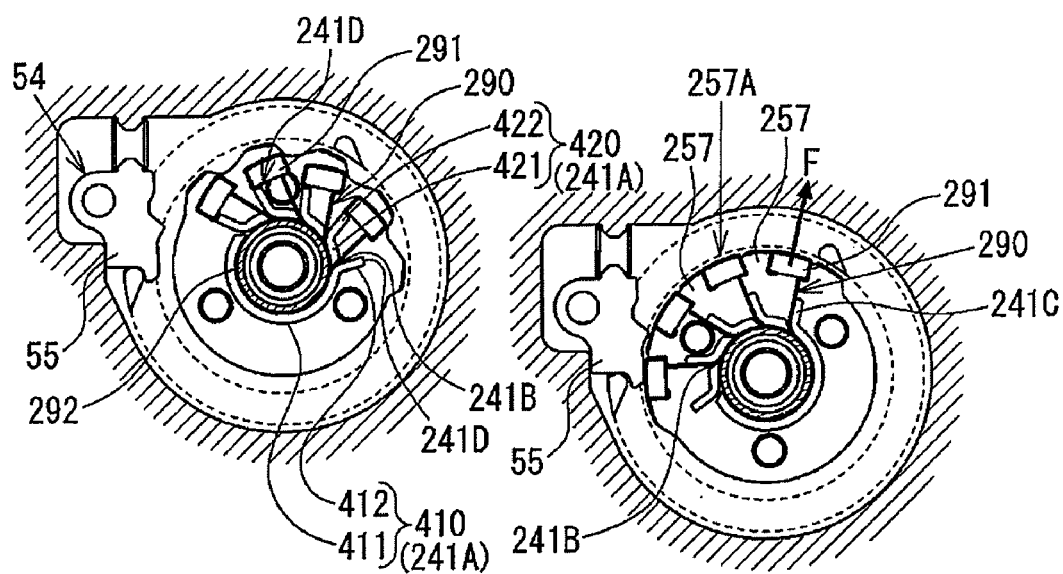
FIGS. 34A and 34B illustrate the operation of the seventh embodiment (FIG. 33), and in particular, FIG. 34A schematically illustrates the portion of the line B-B in FIG. 33 of the disk brake (seventh embodiment) in a certain operation state, and FIG. 34B schematically illustrates the portion of the line B-B in FIG. 33 of the disk brake in a operation state different from that of FIG. 34A.

Next, a disk brake according to a seventh embodiment will be described with reference to FIGS. 33 and 34A-34B. Since the basic structure and operation of the seventh embodiment are similar to those of the fifth embodiment, only different points will be described in detail below.

The seventh embodiment comprises a carrier 241 and pins 247, instead of the carrier 41 and the pins 47 in the fifth embodiment. The pins 247 rotatably support the planetary gears 45, similarly to the pins 47. The pins 247 do no have heads equivalent to the heads 47A of the pins 47, and are press-fittedly fixed to the carrier 241. Ratchet teeth 257 are formed along the outer circumference of the carrier 241, and are configured to abut against the pawl 55 of the lever 54, similarly to the fifth embodiment. A flange 241A is formed at the center of the carrier 241, and includes the same number of cutouts 241B as the number of the gullets 257A defined between the adjacent ratchet teeth 257.

The flange 241A generally comprises a circular arc member 410 and a plurality of dogleg members 420 (four members 420 in the present embodiment). The circular arc member 410 is constituted by an circular-arc-shaped circular arc member body 411 disposed along a sleeve 292 which will be described later, and a circular arc member extending portion 412 bending (forming a substantially dogleg shape) from the circular arc member body 411 in the radially outward direction of the circular arc member body 411

The dogleg member 420 is constituted by a circular-arc-shaped dogleg member body 421 disposed along the sleeve 292 which will be described later, and a dogleg member extending portion 422 bending (forming a substantially dogleg shape) from the dogleg member body 421 in the radially outward direction of the dogleg member body 421. The circular arc member 410 and the four dogleg members 420 are assembled so that a cylinder is defined by the circular arc member body 411 of the circular arc member 410 and the dogleg member bodies 421 of the four dogleg members 420. The above-mentioned cutouts 241B are defined between the circular arc member 410 and the dogleg member 420 or between the dogleg members 420.

One ends of disc springs 290 are disposed in the respective cutouts 241B, and shutter members 291 are fastened to the other ends of the disc springs 290 by swaging. The disc springs 290 are fixed by the sleeve 292 press-fittedly fixed to the inner circumferential side of the flange 241A. In the present embodiment, the one ends of the disc springs 290 are sandwiched between the circular arc member body 411 or the dogleg member body 421 and the sleeve 292. When the carrier 241 is not in operation, as shown in FIG. 34A, the disc springs 290 urge the shutter members 291 so that the shutter members 291 abut against tips 241D of extending portions 241C (the circular arc member extending portion 412 and the dogleg member extending portions 422) of the flange 241A (the circular arc member 410 and the dogleg members 420). The pawl 55 of the lever 54 has a width determined so as to be abuttable against the ratchet tooth 257 and the shutter member 291 at the same time.

The seventh embodiment functions as follows. Similarly to the fifth embodiment, upon receiving an apply request, the motor 38 is driven to rotate, causing a rotation of the planetary gear speed reducing mechanism 36 and thereby a rotation of the carrier 241. At this time, since a centrifugal force F in the radially outward direction of the carrier 241 is applied to the shutter members 291, the shutter members 291 move against the urging forces of the disc springs 290 until the disc springs 290 abut against the extending portions 241C [FIG. 34B]. At this time, since the gullets 257A defined between the adjacent ratchet teeth 257 are hidden in the axial direction by the shutter members 291, the pawl 55 does not enter the gullet 257A and no abutment noise is generated, similarly to the fifth embodiment. In the seventh embodiment, the gullets 257A can be exposed by stopping or slowing down the motor 38 when a desired brake force is obtained. Therefore, the return by a degree corresponding to the backlashes of the elongated holes 80B of the shutter 80 is unnecessary which is necessary in the fifth embodiment, or the return by a degree corresponding to the backlashes of the elongated holes 182 of the shutter 180 is unnecessary which is necessary in the sixth embodiment. As a result, it is possible to reduce the brake force generated by the motor 38, which is advantageous to saving of electric current and enhancement of the durability.

The above-mentioned embodiments provide a disk brake comprising a pair of pads disposed on the respective sides of a disk, a piston adapted to press at least one of the pair of pads against the disk, a caliper body having a cylinder capable of containing the piston such that the piston is movable in the cylinder, the caliper body adapted to advance the piston by a supply of a fluid pressure into the cylinder, an electric motor disposed at the caliper body, and a parking brake mechanism disposed at the caliper body, the parking brake mechanism operable to advance the piston based on a rotation of the electric motor and maintain the advanced piston at a parking brake applying position. The parking brake mechanism includes a speed reducing mechanism for increasing a rotational force from the electric motor, a rotation/linear motion converting mechanism for converting a rotation of the speed reducing mechanism into a linear motion, and a rotation preventing mechanism for preventing a rotation of the speed reducing mechanism in a direction causing the piston to return. The speed reducing mechanism comprises an input member adapted to rotate in response to an input from the motor, and a pair of output members adapted to rotate in opposing directions so as to increase a rotational input from the input member to provide a rotational output. The speed reducing mechanism is constituted by an input-output coaxial type speed reducer in which the pair of output members and the input member are coaxially disposed. One output member of the pair of output members transmits a rotation to the rotation/linear motion converting mechanism. The rotation preventing mechanism prevents a rotation of the one output member in the direction causing the piston to return. The other output member of the pair of output members rotates by a predetermined range to act on the rotation preventing mechanism. When the motor causes the input member to rotate so that the piston moves in a return direction, a rotation of the other output member according to the rotation of the input member releases rotation prevention of the rotation preventing mechanism to the one output member. According to the disk brake configured in this way, it is possible to improve the responsiveness of the parking brake function of the disk brake.

In the above-mentioned embodiments, the input member and the other output member rotate in opposing directions, and the input member and the one output member rotate in a same direction.

In the above-mentioned embodiments, the rotation preventing mechanism comprises an engagement portion disposed at the one output member, and a lever member supported by the caliper body, the lever member adapted to be engaged with and disengaged from the engagement portion.

In the above-mentioned embodiments, the other output member comprises a pair of contact portions, and an engagement position is a position when one contact portion of the contact portions contacts the lever member, and a disengagement position is a position when the other contact portion of the contact portions contacts the lever member.

In the above-mentioned embodiments, a force in the a direction for disengaging the lever member from the engagement portion is applied to the lever member by a force applying member.

In the above-mentioned embodiments, the rotation preventing mechanism is supported by the caliper body, and comprises an engagement member adapted to be engaged with and disengaged from the one output member in response to a rotational force of the other output member according to a rotational direction of the other output member.

In the above-mentioned embodiments, the rotation preventing mechanism is movable between a first position, in which the rotation preventing mechanism prevents a rotation of the one output member in the direction causing the piston to return when the one output member rotates in a direction causing the piston to advance, and a second position, in which the rotation preventing mechanism allows a rotation of the one output member in the direction causing the piston to return when the one output member rotates in the direction causing the piston to return.

In the above-mentioned first, second, third, fifth, sixth, and seventh embodiments, the speed reducing mechanism is embodied by a planetary gear speed reducing mechanism.

In the above-mentioned first, second, third, fifth, sixth, and seventh embodiments, the planetary gear speed reducing mechanism comprises an input gear adapted to rotate in response to an input from the electric motor, a planetary gear adapted to revolve around the input gear according to the rotation of the input gear by being meshed with the input gear, an output member adapted to rotate by the revolution of the planetary gear, and a guide member adapted to allow the planetary gear to revolve around the input gear by reducing the rotation of the planetary gear around its own axis by being meshed with the planetary gear, and rotate by a rotational force from the planetary gear. One member of the output member and the guide member is adapted to transmit a rotation to the rotation linear motion converting mechanism. The other member of the output member and the guide member is adapted to rotate by a predetermined range to act on the rotation preventing mechanism. The rotation preventing mechanism comprises an engagement portion formed at the one member, and a lever member supported by the caliper body and adapted to be engaged with and disengaged from the engagement portion by a rotational force from the other member.

In the above-mentioned embodiments, the rotation/linear motion converting mechanism is embodied by a ball ramp mechanism.

In the above-mentioned embodiments, a wear compensating mechanism is disposed between the ball ramp mechanism and the piston for maintaining the piston at an advanced position according to a wear degree of the pad.

In the above-mentioned fourth embodiment, the rotation/linear motion converting mechanism is a screw mechanism.

In the above-mentioned embodiments, the electric motor is controlled by a controller for driving the electric motor based on a maintaining signal or a releasing signal from a parking brake instruction unit. The controller starts to drive the electric motor based on the maintaining signal from the parking brake instruction unit, and stops the electric motor after the electric motor shows an electric current value causing the piston to be situated at the parking brake applying position, whereby the rotation preventing mechanism prevents a rotation of the one output member.

In the above-mentioned embodiments, the controller starts to drive the electric motor in the direction causing the piston to return based on the releasing signal from the parking brake instruction unit, and stops the electric motor based on an electric current value of the electric motor.

In the above-mentioned fifth, sixth, and seventh embodiments, the speed reducing mechanism comprises a rotator. The rotation preventing mechanism prevents a rotation of the rotator in the direction causing the piston to return by being engaged with any one of a plurality of protrusions formed at the rotator. The rotation preventing mechanism is urged in a direction such that the rotation preventing mechanism abuts against the plurality of protrusions of the rotator when the rotator rotates in a direction causing the piston to advance. The rotator of the speed reducing mechanism comprises a shutter member for preventing an entry of the rotation preventing mechanism into a space between the protrusions when the rotator rotates in the direction causing the piston to advance. According to the disk brake configured in this way, it is possible to reduce the attachment noise of the ratchet mechanism at the time of application of the parking brake, whereby a quiet operation of the disk brake is realized.

Although only some exemplary embodiments have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priorities under 35 U.S.C. section 119 to Japanese Patent Application No. 2008-333185, filed on Dec. 26, 2008 and Japanese Patent Application No. 2009-228611, filed on Sep. 30, 2009. The entire disclosures of Japanese Patent Application No. 2008-333185, filed on Dec. 26, 2008, and Japanese Patent Application No. 2009-228611, filed on Sep. 30, 2009, including specification, claims, drawings and summary are incorporated herein by reference in its entirety.

What is claimed is:

1. A disk brake comprising:
  a pair of pads disposed on the respective sides of a disk;
  a piston adapted to press at least one of the pair of pads against the disk;
  a caliper body including a cylinder capable of containing the piston such that the piston is movable in the cylinder, the caliper body adapted to advance the piston by a supply of a fluid pressure into the cylinder;
  an electric motor disposed at the caliper body; and
  a parking brake mechanism disposed at the caliper body, the parking brake mechanism operable to advance the piston based on a rotation of the electric motor and maintain the advanced piston at a parking brake applying position,
  the parking brake mechanism comprising a speed reducing mechanism for increasing a rotational force from the electric motor, a rotation/linear motion converting mechanism for converting a rotation of the speed reducing mechanism into a linear motion, and a rotation preventing mechanism for preventing a rotation of the speed reducing mechanism in a direction causing the piston to return,
  the speed reducing mechanism comprising an input member adapted to rotate in response to an input from the motor, and a pair of output members adapted to rotate in opposing directions so as to increase a rotational input from the input member to provide a rotational output, the speed reducing mechanism constituted by an input-output coaxial type speed reducer in which the pair of output members and the input member are coaxially disposed;
  wherein one output member of the pair of output members transmits a rotation to the rotation/linear motion converting mechanism;
  the rotation preventing mechanism prevents a rotation of the one output member in the direction causing the piston to return;
  the other output member of the pair of output members rotates by a predetermined range to act on the rotation preventing mechanism;
  when the motor causes the input member to rotate so that the piston moves in a return direction, a rotation of the other output member according to the rotation of the input member releases rotation prevention of the rotation preventing mechanism to the one output member;
  the rotation preventing mechanism is supported by the caliper body, and comprises an engagement member adapted to be engaged with and disengaged from the one output member according to a rotational direction of the other output member; and
  the other output member includes at least one contact portion, and when the motor rotates so that the piston moves in the return direction, the other output member rotates and the at least one contact portion contacts the engagement member to move the engagement member from an engagement position, where the engagement member is engaged with the one output member, to a disengagement position, where the engagement member is disengaged from the one output member.

2. The disk brake according to claim 1, wherein the input member and the other output member rotate in opposing directions, and the input member and the one output member rotate in a same direction.

3. The disk brake according to claim 2, wherein the rotation preventing mechanism further comprises a plurality of engagement portions disposed at the one output member, and the engagement member is a lever member adapted to be engaged with and disengaged from the engagement portions.

4. The disk brake according to claim 3, wherein the other output member comprises a pair of contact portions, and the engagement position is a position when one contact portion of the contact portions contacts the lever member, and the disengagement position is a position when the other contact portion of the contact portions contacts the lever member.

5. The disk brake according to claim 3, wherein a force in a direction for disengaging the lever member from the engagement portions is applied to the lever member by a force applying member.

6. The disk brake according to claim 3, a force in a direction for engaging the lever member with the engagement portion is applied to the lever member by a force applying member.

7. The disk brake according to claim 3, wherein:
  the lever member is urged in a direction such that the lever member abuts against the plurality of engagement portions of the one output member when the one output member rotates in a direction causing the piston to advance; and
  the one output member comprises a shutter member for preventing an entry of the lever member into a space between the engagement portions when the one output member rotates in the direction causing the piston to advance.

8. The disk brake according to claim 7, wherein the shutter member comprises a plurality of protrusions in alignment with gullets between the engagement portions when the shutter member rotates in a direction causing the piston to advance, and in alignment with the engagement portions when the shutter member rotates in a direction causing the piston to return.

9. The disk brake according to claim 1, wherein the engagement member is movable according to the rotational direction of the other output member between the engagement position, in which the engagement member prevents a rotation of the one output member in the direction causing the piston to return when the one output member rotates in a direction causing the piston to advance, and the disengagement position, in which the engagement member allows a rotation of the one output member in the direction causing the piston to return when the one output member rotates in the direction causing the piston to return.

10. The disk brake according to claim 1, wherein:
the electric motor is controlled by a controller for driving the electric motor based on a maintaining signal or a releasing signal from a parking brake instruction unit; and
the controller starts to drive the electric motor based on the maintaining signal from the parking brake instruction unit, and stops the electric motor after an electric current value causing the piston to be situated at the parking brake applying position is obtained, whereby the engagement member prevents a rotation of the one output member.

11. A disk brake comprising:
a caliper body including a cylinder capable of containing a piston such that the piston is movable in the cylinder, the piston adapted to press at least one of a pair of pads against a disk, the pair of pads disposed on the respective sides of the disk; and
a parking brake mechanism operable to maintain, at a parking brake applying position, the piston advanced based on a rotation of an electric motor disposed at the caliper body,
the parking brake mechanism comprising a planetary gear speed reducing mechanism for increasing a rotational force from the electric motor, a rotation/linear motion converting mechanism for converting a rotation of the planetary gear speed reducing mechanism into a linear motion to advance the piston, and a rotation preventing mechanism for preventing a rotation of the planetary gear speed reducing mechanism in a direction causing the piston to return,
the planetary gear speed reducing mechanism comprising an input gear adapted to rotate in response to an input from the electric motor, a planetary gear adapted to revolve around the input gear according to the rotation of the input gear by being meshed with the input gear, an output member adapted to rotate by the revolution of the planetary gear, and a guide member adapted to allow the planetary gear to revolve around the input gear by reducing the rotation of the planetary gear around its own axis by being meshed with the planetary gear, and rotate by a rotational force from the planetary gear,
one member of the output member and the guide member adapted to transmit a rotation to the rotation linear motion converting mechanism, the other member of the output member and the guide member adapted to rotate by a predetermined range to act on the rotation preventing mechanism,
the rotation preventing mechanism comprising an engagement portion formed at the one member, and a lever member supported by the caliper body and adapted to be engaged with and disengaged from the engagement portion by a rotational force from the other member;
wherein the other member of the output member and the guide member comprises a pair of contact portions, and an engagement position is a position when one contact portion of the contact portions contacts the lever member, and a disengagement position is a position when the other contact portion of the contact portions contacts the lever member.

12. The disk brake according to claim 11, wherein the input member and the other member of the output member and the guide member rotate in opposing directions, and the input member and the one member of the output member and the guide member rotate in a same direction.

13. The disk brake according to claim 11, wherein the lever member is movable according to the rotational direction of the other output member between the engagement position, in which the lever member prevents a rotation of the one member of the output member and the guide member in the direction causing the piston to return when the one member of the output member and the guide member rotates in a direction causing the piston to advance, and the disengagement position, in which the lever member allows a rotation of the one member of the output member and the guide member in the direction causing the piston to return when the one member of the output member and the guide member rotates in the direction causing the piston to return.

14. The disk brake according to claim 11, wherein a force in a direction for disengaging the lever member form the engagement portion is applied to the lever member by an urging member.

15. The disk brake according to claim 11, wherein:
the one output member comprises a plurality of engagement portions;
the lever member is urged in a direction such that the lever member abuts against the plurality of engagement portions of the one output member when the one output member rotates in a direction causing the piston to advance; and
the one output member comprises a shutter member for preventing an entry of the lever member into a space between the engagement portions when the one output member rotates in the direction causing the piston to advance.

16. The disk brake according to claim 11, wherein:
the electric motor is controlled by a controller for driving the electric motor based on a maintaining signal or a releasing signal from a parking brake instruction unit; and
the controller starts to drive the electric motor based on the maintaining signal from the parking brake instruction unit, and stops the electric motor after an electric current value causing the piston to be situated at the parking brake applying position is obtained, whereby the engagement member prevents a rotation of the one output member.

17. A disk brake comprising:
a parking brake mechanism disposed at a caliper body including a piston adapted to press a pad against a disk, the parking brake mechanism operable to maintain, at a parking brake applying position, a piston advanced based on a rotation of an electric motor;

a parking brake instruction unit for issuing an instruction to maintain the piston at the parking brake applying position by the parking brake mechanism or an instruction to release maintenance of the piston at the parking brake applying position; and a controller for driving the electric motor based on a maintaining signal or a releasing signal from the parking brake instruction unit, the parking brake mechanism comprising a speed reducing mechanism for increasing a rotational force from the electric motor, a rotation/linear motion converting mechanism for converting a rotation of the speed reducing mechanism into a linear motion, and a rotation preventing mechanism for preventing a rotation of the speed reducing mechanism in a direction causing the piston to return, the speed reducing mechanism comprising an input member adapted to rotate in response to an input from the motor, and a pair of output members adapted to rotate in opposing directions so as to increase a rotational input from the input member to provide a rotational output, the speed reducing mechanism constituted by an input-output coaxial type speed reducer in which the pair of output members and the input member are coaxially disposed;

wherein one output member of the pair of output members transmits a rotation to the rotation/linear motion converting mechanism;

the rotation preventing mechanism prevents a rotation of the one output member in the direction causing the piston to return;

the other output member of the pair of output members rotates by a predetermined range to act on the rotation preventing mechanism;

when the motor causes the input member to rotate so that the piston moves in a return direction, a rotation of the other output member according to the rotation of the input member releases rotation prevention of the rotation preventing mechanism to the one output member;

the controller starts to drive the electric motor based on the maintaining signal from the parking brake instruction unit, and stops the electric motor after an electric current value causing the piston to be situated at the parking brake applying position by the electric motor is obtained, whereby the rotation preventing mechanism prevents a rotation of the one output member;

the rotation preventing mechanism comprises an engagement portion disposed at the one output member, and a lever member supported by the caliper body, the lever member being adapted to be engaged with and disengaged from the engagement portion; and the other output member comprises a pair of contact portions, and an engagement position is a position when one contact portion of the contact portions contacts the lever member, and a disengagement position is a position when the other contact portion of the contact portions contacts the lever member.

18. The disk brake according to claim 17, wherein the input member and the other output member rotate in opposing directions, and the input member and the one output member rotate in a same direction.

19. The disk brake according to claim 17, wherein the lever member is movable between the engagement position, in which the lever member prevents a rotation of the one output member in the direction causing the piston to return when the one output member rotates in a direction causing the piston to advance, and the disengagement position, in which the lever member allows a rotation of the one output member in the direction causing the piston to return when the one output member rotates in the direction causing the piston to return.

20. The disk brake according to claim 17, wherein a force in a direction for disengaging the lever member from the engagement portion is applied to the lever member by a force application member.

* * * * *